（12） United States Patent
Csajaghy et al.

(10) Patent No.: US 11,476,941 B2
(45) Date of Patent: Oct. 18, 2022

(54) OPTICAL WIRELESS COMMUNICATION TRANSCEIVER AND METHOD FOR CONTROLLING THE POWER MODE OF SUCH A TRANSCEIVER

(71) Applicant: pureLiFi Limited, Edinburgh (GB)

(72) Inventors: Istvan Phillipe Bernard Csajaghy, Edinburgh (GB); Stephan Berner, Penicuik (GB)

(73) Assignee: PURELIFI LIMITED, Edinburgh (GB)

( * ) Notice: Subject to any disclaimer, the term of this patent is extended or adjusted under 35 U.S.C. 154(b) by 0 days.

(21) Appl. No.: 17/312,606

(22) PCT Filed: Dec. 12, 2019

(86) PCT No.: PCT/GB2019/053520
§ 371 (c)(1),
(2) Date: Jun. 10, 2021

(87) PCT Pub. No.: WO2020/120968
PCT Pub. Date: Jun. 18, 2020

(65) Prior Publication Data
US 2022/0045761 A1    Feb. 10, 2022

(30) Foreign Application Priority Data
Dec. 14, 2018   (GB) ..................................... 1820402

(51) Int. Cl.
*H04B 10/40* (2013.01)
*H04B 10/116* (2013.01)

(52) U.S. Cl.
CPC ........... *H04B 10/40* (2013.01); *H04B 10/116* (2013.01)

(58) Field of Classification Search
CPC .............................. H04B 10/40; H04B 10/116
(Continued)

(56) References Cited

U.S. PATENT DOCUMENTS 5,917,629 A * 6/1999 Hortensius ................ H04L 1/14
398/118
9,794,489 B2    10/2017 Oshima et al.
(Continued)

FOREIGN PATENT DOCUMENTS

EP    1356610 B1    7/2017
GB    2569288 A    6/2019
(Continued)

OTHER PUBLICATIONS

"International Search Report and Written Opinion of the International Searching Authority", PCT International Application No. PCT/GB2019/053520, dated Mar. 27, 2020, 9 pp.
(Continued)

*Primary Examiner* — Dalzid E Singh
(74) *Attorney, Agent, or Firm* — Myers Bigel, P.A.

(57) ABSTRACT

An optical wireless communication (OWC) transceiver apparatus comprises: at least one light transmitter configured to transmit light of a first wavelength or first range of wavelengths; driver circuitry configured to receive a data signal and to process the data signal to produce a driving signal to drive the at least one light transmitter such that the at least one light transmitter produces a modulated optical signal representative of said data signal; at least one photodetector configured to receive light of a second wavelength or second range of wavelengths and to produce a detection signal in response to the received light; receiver circuitry configured to receive and process the detection signal to produce a receiver signal; demodulation circuitry configured to perform a decoding and/or demodulation process in accordance with an OWC protocol thereby to extract data
(Continued)

from the receiver signal; wherein the transceiver apparatus further comprises: a motion sensor configured to sense motion of at least one object in a region about the transceiver apparatus and to produce motion sensor output based on said sensed motion, and a controller configured to move the transceiver apparatus from a lower power configuration to an intermediate power configuration in response to the motion sensor sensing motion, wherein in the intermediate power configuration the controller is configured to monitor output from at least the at least one photodetector and/or the receiver circuitry and move the transceiver apparatus from the intermediate power configuration to a higher power configuration in response to the monitored output being indicative that the at least one photodetector has received light representative of an optical wireless communication signal.

23 Claims, 14 Drawing Sheets

(58) Field of Classification Search
USPC ........................................................ 398/118
See application file for complete search history.

(56) References Cited

U.S. PATENT DOCUMENTS

| 10,344,927 | B1* | 7/2019 | Wright ................. G08B 13/19 |
| 2002/0131121 | A1* | 9/2002 | Jeganathan ........ H04B 10/1127 |
| | | | 398/118 |
| 2017/0339769 | A1 | 11/2017 | Wennemyr et al. |
| 2018/0088208 | A1 | 3/2018 | Gagrani et al. |
| 2018/0191436 | A1 | 7/2018 | Kadambala et al. |
| 2018/0262270 | A1 | 9/2018 | Maricic et al. |
| 2019/0150245 | A1* | 5/2019 | Chen ................... H05B 39/042 |
| | | | 315/149 |

FOREIGN PATENT DOCUMENTS

| GB | 2571710 A | 9/2019 |
| WO | 2020074920 A1 | 4/2020 |

OTHER PUBLICATIONS

"Patents Act 1977: Search Report under Section 17(5)", GB Application No. GB1820402.4, dated May 30, 2019, 3 pp.
Sewaiwar, Atul, et al., "Visible light communication based motion detection", Optics Express, vol. 23, No. 14, Jul. 2015, 9 pp.

* cited by examiner

OPTICAL WIRELESS COMMUNICATION TRANSCEIVER AND METHOD FOR CONTROLLING THE POWER MODE OF SUCH A TRANSCEIVER

CROSS-REFERENCE TO RELATED APPLICATIONS

The present application is a 35 U.S.C. § 371 national stage application of PCT Application No. PCT/GB2019/053520, filed Dec. 12, 2019, which itself claims priority to GB Patent Application No. 1820402.4, filed Dec. 14, 2018, the entire contents of both of which are incorporated herein by reference in their entireties. The above-referenced PCT Application was published in the English language as International Publication No. WO 2020/120968 A1 on Jun. 18, 2020.

INTRODUCTION

The present invention relates to wireless communication system and method, for example an optical wireless communication system and method.

Reference is made to UK Patent Application Nos. GB1720440.5, GB1803299.5, and 1816598.5 the contents of which are hereby incorporated by reference.

BACKGROUND

It is known to provide wireless data communications by using light instead of radio frequencies to transmit and receive data wirelessly between devices. Data may be transmitted using light by modulating at least one property of the light, for example the intensity of the light. Methods that use light to transmit data wirelessly may be referred to as optical wireless communications (OWC) or light communications (LC). LiFi is one form of optical wireless communication.

In Optical Wireless Communication systems (for example, LiFi systems), usually a number of Access Points (APs) communicate with a number of Stations (STAs). Both the Access Points and the Stations may be full duplex devices, capable of transmitting and receiving communication data at the same time.

In known OWC systems, an access point or station may transmit signals even when there is no other station or access point in range. Such systems may be inefficient and waste battery resources.

SUMMARY

According to a first aspect of the invention, there is provided an optical wireless communication (OWC) transceiver apparatus comprising:
  at least one light transmitter configured to transmit light of a first wavelength or first range of wavelengths;
  driver circuitry configured to receive a data signal and to process the data signal to produce a driving signal to drive the at least one light transmitter such that the at least one light transmitter produces a modulated optical signal representative of said data signal;
  at least one photodetector configured to receive light of a second wavelength or second range of wavelengths and to produce a detection signal in response to the received light;
  receiver circuitry configured to receive and process the detection signal to produce a receiver signal;
  demodulation circuitry configured to perform a decoding and/or demodulation process in accordance with an OWC protocol thereby to extract data from the receiver signal;
wherein the transceiver apparatus further comprises:
  a motion sensor configured to sense motion of at least one object in a region about the transceiver apparatus and to produce motion sensor output based on said sensed motion, and
  a controller configured to move the transceiver apparatus from a lower power configuration to an intermediate power configuration in response to the motion sensor sensing motion,
  wherein in the intermediate power configuration the controller is configured to monitor output from at least the at least one photodetector and/or the receiver circuitry and move the transceiver apparatus from the intermediate power configuration to a higher power configuration in response to the monitored output being indicative that the at least one photodetector has received light representative of an optical wireless communication signal.

The at least one light transmitter may comprise a light emitting device. The at least one photodetector may comprise a light detector. The receiver circuitry may comprise receiver optical front end circuitry. The driver circuitry may comprise transmitter optical front end circuitry. The demodulation circuitry may be provided as part of a baseband apparatus. The transceiver apparatus may further comprise modulation circuitry configured to perform an encoding and/or modulation process in accordance with an OWC protocol thereby to encode data for the modulated optical signal. The modulation circuitry may be provided as part of a baseband apparatus. The demodulation and modulation circuitry may be provided as part of a baseband apparatus. The controller may comprise controlling circuitry The transceiver apparatus may further comprise a host processing resource for communicating with a network.

In the intermediate power configuration the controller may be further configured to monitor output from the demodulation circuitry.

In the intermediate power configuration the controller may be further configured to monitor output from the baseband apparatus.

The transceiver apparatus may be moved from the intermediate power configuration to a higher power configuration in response to the monitored output being indicative that the at least one photodetector has received light representative of at least one of: an optical wireless communication protocol signal or activity on an optical channel.

The transceiver apparatus may comprise or forms part of an access point for allowing access to a network.

Moving the transceiver apparatus between power configurations may comprise changing the power state of at least one of:
  the at least one light transmitter, the driver circuitry, the at least one photodetector, the receiver circuitry, the demodulation circuitry.

Moving the transceiver apparatus between power configurations may comprise changing the power state of the host resource.

Moving the transceiver apparatus between power configurations may further comprise changing the power state of at least one of:

the light emitting device, the transmitter and/or receiver optical front end circuitry, the light detector, the demodulation circuitry, the modulation circuitry, the baseband apparatus.

When in the intermediate power configuration the transceiver apparatus may be configured to perform a beacon signal process comprising: transmitting a beacon signal to and receiving a response signal from a remote optical wireless communication enabled device, wherein the controller is configured to move the transceiver apparatus from the intermediate power configuration to the higher power configuration on successful completion of the beacon signal process.

The beacon signal process may further comprises performing a handshake procedure with the remote optical wireless communication enabled remote device in accordance with an optical wireless communication handshake protocol.

In the intermediate power mode, the transceiver apparatus may be configured to receive at least part of an optical wireless communication signal re-transmitted by a remote device.

In the intermediate power mode, the transceiver apparatus may be configured to receive at least part of an optical wireless communication signal transmitted by the transceiver apparatus and re-transmitted by a remote device.

In the lower power configuration, the motion sensor may be in a power state in which the motion sensor can sense motion and produce motion sensor output and substantially all other components of the transceiver apparatus are in a lower or a switched off state.

In the higher power configuration, the motion sensor may be in a lower or switched off power state and substantially all other components of the transceiver apparatus are in a higher or switched on state.

The at least one light transmitter is configured to transmit light signals through a first field of view and the motion sensor is configured to detect motion that occurs substantially in said first field of view.

In the intermediate power configuration the at least one light transmitter may be configured to transmit a wake-up signal in accordance with a pre-determined protocol to move the operating mode of one or more components of the remote device between two or more power states.

The wake-up signal may cause the remote device to move to an intermediate power state in which the remote device is configured to monitor for beacon signals and/or to monitor for activity on an optical channel.

The transceiver apparatus may comprise monitoring circuitry configured to monitor for one or more signals from a further device that are transmitted in accordance with a pre-determined timing protocol and the controller is configured to move the transceiver apparatus between two or more power configurations based on at least the motion sensor output and the monitored signals.

The motion sensor may comprise a photodetector.

The motion sensor may comprise at least one optical wireless communication component of the transceiver apparatus.

The motion sensor may comprise at least one shared component with at least one of: the at least one light transmitter, the driver circuitry, the at least one photodetector, the receiver circuitry and/or the demodulation circuitry.

The motion sensor may comprise at least one shared component with at least one of:

the modulation circuitry, the baseband apparatus and/or the host processing resource.

In the lower power configuration, the at least one shared component may be in a higher or intermediate power mode so that the motion sensor is capable of sensing motion.

The motion sensor may comprise the at least one photodetector and the motion sensor output may be based on a change in at least one property of the detection signal.

The at least one property may comprise: detection signal strength, detection signal quality, detection signal intensity.

The at least one property may comprise:

receiver signal strength, receiver signal quality, receiver signal intensity.

The receiver circuitry may comprise a further signal processing element configured to:

determine that the detection signal has one or more characteristics of optical wireless communication signals and provide said signal to the controller wherein the controller moves the transceiver apparatus from an intermediate power configuration to a higher power configuration in response to receiving said signal.

The motion sensor may comprise a further signal processing element configured to:

determine that the detection signal has one or more characteristics of optical wireless communication signals and provide said signal to the demodulation circuitry to perform the demodulation process.

The further signal processing element may comprise a bandpass filter for filtering detection signals.

The motion sensor may be configured to monitor light reflections from the at least one object in the region about the transceiver apparatus. The motion sensor may be configured to process detection signals thereby to detect reflection from light transmitted by the transceiver apparatus.

Motion may be sensed by determining at least one of: a change in time of flight; a change in detected light direction; a change in detected light intensity.

The transceiver apparatus may be configured to communicate with a remote device over a visible light channel and an non-visible channel and the controller is configured to control reception and transmission of signals over said channels.

The transceiver apparatus may comprise at least one light transmitter that comprises a visible light source and the controller is configured to move the visible light source between at least:

a first power state in which the visible light source emits unmodulated light and a second power state in which the visible light source emits modulated light.

The transceiver apparatus may further comprise or be coupled to a visible light source, wherein the transceiver apparatus is configured to switch the channel used for optical communication when the light source is switched between on and off.

The at least one light transmitter may comprise a visible light source and the controller is further configured to receive an external electronic control signal from a further apparatus and to move the visible light source between two or more power states based on the received external control signal.

The controller may be further configured to perform an identification process to identify a further remote device, and to determine that the further device is a mobile device or a static device based at least on said identification process.

The controller may be further configured to move the motion sensor between two or more power states when moving the transceiver apparatus between power configurations.

The at least one light transmitter may comprise at least one of: a light emitting diode, a vertical-cavity surface-emitting laser (VCSEL).

The at least one photodetector may comprise at least one of: a photodiode, avalanche photodiodes, a single-photon avalanche photodiode, photomultiplier tube, solar cell, photodiode operating in a solar cell mode, silicon photomultiplier, a PIN diode, at least part of a CCD or a CMOS sensor.

According to a second aspect of the invention, there is provided a method comprising:
  sensing motion in a region about a transceiver apparatus;
  moving the transceiver apparatus from a lower power configuration to an intermediate power configuration in response to the motion sensor sensing motion;
  monitoring output from at least an at least one photodetector and/or receiver circuitry of the transceiver apparatus, and
  moving the transceiver apparatus from the intermediate power configuration to a higher power configuration in response to the monitored output being indicative that the at least one photodetector has received light representative of an optical wireless communication signal.

Any feature in one aspect of the invention may be applied to other aspects of the invention, in any appropriate combination. For example, apparatus features may be applied as method features and vice versa.

BRIEF DESCRIPTION OF THE DRAWINGS

Various aspects of the invention will now be described by way of example only, and with reference to the accompanying drawings, of which.

DETAILED DESCRIPTION OF THE DRAWINGS

The term light herein may be used, for example, to refer to electromagnetic waves with wavelengths in a range 1 nm to 2500 nm, which includes ultraviolet, visible light and near-infrared wavelengths.

Embodiments described below are described in terms of optical wireless communication systems, for example LiFi systems. However, in other embodiments, methods described below may be applied to any form of cellular wireless systems, for example RF systems.

Figure 1:
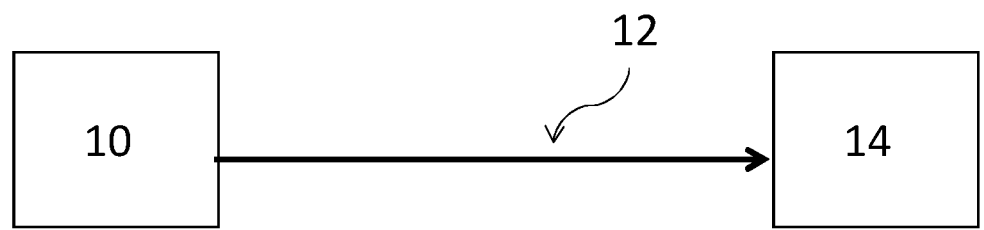
FIG. 1 is a block diagram of a transmitter and receiver communicating using optical wireless communication.

FIG. 1 is a block diagram illustrating principles of optical wireless communication (OWC) according to embodiments. FIG. 1 shows a transmitter apparatus 10 and a receiver apparatus 14. The transmitter apparatus 10 is configured to send wireless optical signals in which information is encoded through an optical communication channel 12 to the receiver apparatus 14. The optical communication channel 12 may be a free-space communication channel. The optical communication channel 12 has a characteristic wavelength.

Free space communication channels include transmission of optical signals through air, space, vacuum, liquid such as water or similar.

Transmitters and receivers may be provided on different devices. One type of device that is used is an access point (AP). Access points may provide access to a further network, for example the internet. Another type of device is a station (STA). Stations may be portable or fixed. Without limitation, examples of stations include personal computers, desktops, laptops and smart devices, including mobile devices (for example, mobile phones, tablets or digital book readers). Portable stations may be powered by their own battery resource.

An access point may provide data transmission to and/or from a wired network or a Wi-Fi™ or other wireless network and/or other optical wireless communications network, optionally a LiFi network.

Any suitable modulation scheme may be used. For example, orthogonal frequency division multiplexing (OFDM) modulation schemes are used in some embodiments, and the demodulation uses the OFDM modulation scheme. In further embodiments and without limitation, other modulation schemes may be used, for example on-off keying (OOK), phase shift keying (PSK), M-ary pulse amplitude modulation (M-PAM), M-ary quadrature amplitude modulation (M-QAM), Discrete Hartley transformation, Wavelet packet division multiplexing (WPDM), Hadamard coded modulation (HCM), pulse-position modulation (PPM), Colour shift keying (CSK), carrier-less amplitude and phase (CAP), or discrete multi-tone (DMT). The light may be modulated at a modulation rate between 1 kHz and 1 PHz, for example at a modulation rate between 1 MHz and 100 GHz.

The modulation scheme may form part of an OWC communication protocol, such that the optical signal is produced according to the OWC communication protocol. The OWC communication protocol may be packet-based.

Access points can have both a receiver apparatus, as described below, and a transmitter apparatus, as described below, provided as part of the same device. An access point may have its receiver apparatus switched on and may continually receive light, even when out of range of a remote transmitter apparatus and/or when the remote transmitter apparatus is not sending optical signals and/or when the remote transmitter apparatus is switched off. Similarly, the access point may also have its transmitter apparatus switched on and may continually transmit light, even when out of range of a remote receiver apparatus and/or when the remote receiver apparatus is not receiving optical signals and/or when the remote receiver apparatus is switched off. This may prove to be a drain and/or inefficient use of battery or power resources of, or associated with, the access point.

Figure 2:
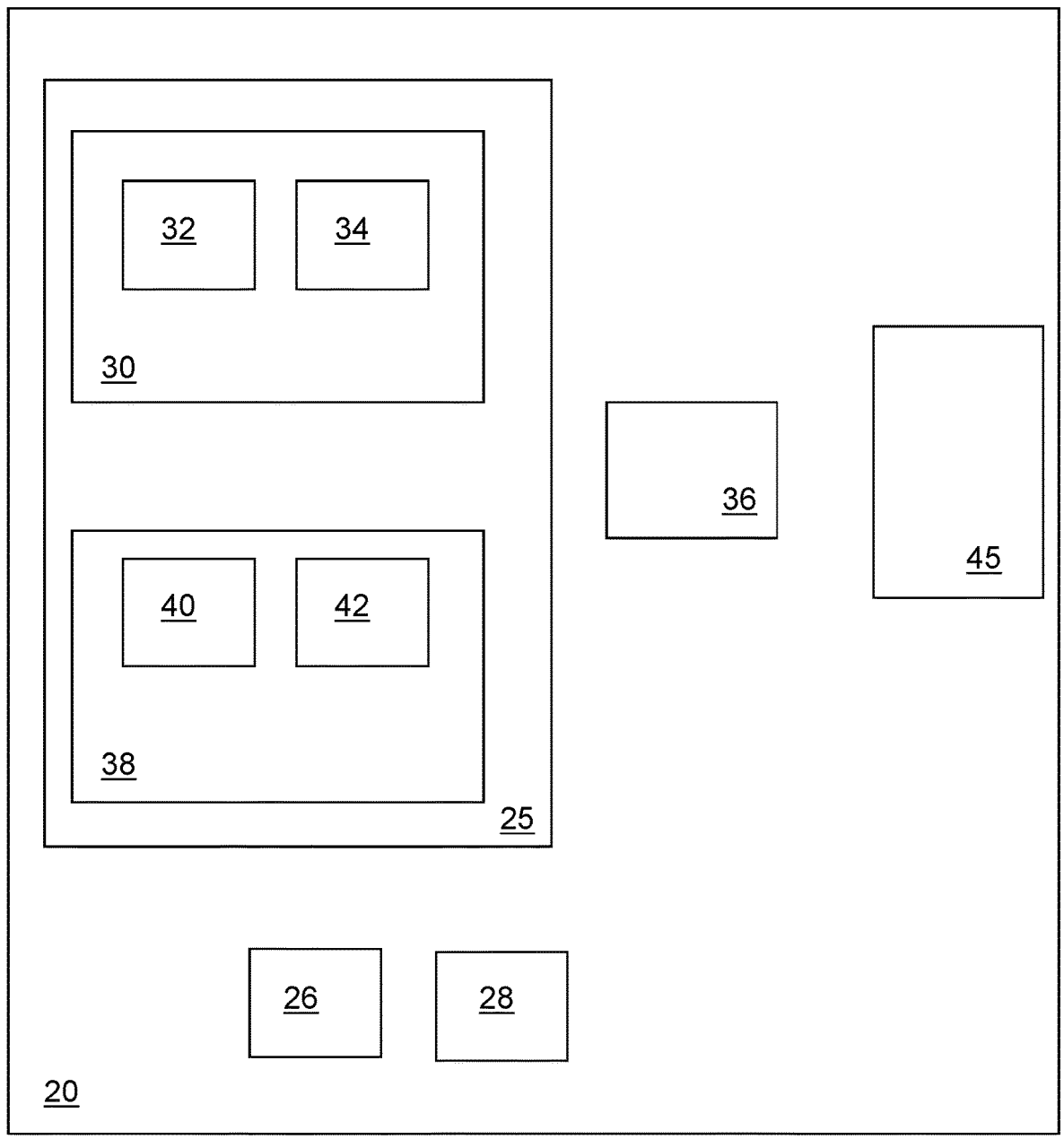
FIG. 2 is a schematic diagram of a transceiver apparatus configured to perform optical wireless communication in accordance with embodiments.

FIG. 2 is a schematic diagram of an optical wireless transceiver apparatus 20 that uses optical wireless communication in accordance with embodiments. For brevity, the OWC transceiver apparatus 20 may also be referred to as transceiver apparatus 20 or as transceiver 20. The transceiver 20 has an OWC transmitter optical front end module 30 and an OWC receiver optical front end module 38.

The transmitter optical front end module 30 may also be referred to as the transmitter optical front end, The receiver optical front end module 38 may also be referred to as the receiver optical front end. In FIG. 2, the transmitter optical front end module 30 and the receiver optical front end module 38 are shown as forming part of an optical front end 25 of the transceiver 20.

The transceiver 20 also has a motion sensor 26 and a controller 28. The controller 28 comprises circuitry configured to send control signals to one or more parts of the OWC receiver and transmitter optical front end modules. The controller 28 may also be referred to as controlling circuitry. The controller 28 also comprises signal monitoring circuitry. The signal monitoring circuitry is configured to monitor and/or receive signals from the motion sensor 26 and/or one or more parts of the OWC receiver optical front end module 38. The controller 28 sends control signals based on the monitored signals. The controller 28 is configured to send control signals to one or more components of the transceiver 20.

The signal monitoring circuitry of the controller 28 is provided to monitor output from the motion sensor 26 and optionally at least one of the photodetector 40, the receiver optical front end circuitry 42 and the baseband apparatus 36. The controller 28 performs one or more power up and/or power down procedures on the components of the transceiver apparatus 20 based on the monitored output.

In embodiments where the controller 28 has more than one component, one component of the controller 28 may be configured to perform a power up or power down procedure on another component of the controller 28. In some embodiments, the controller 28 can perform a power up or power down procedure on itself and/or on the motion sensor 26.

In the present embodiment, the transceiver 20 has a host resource 45, which, for brevity may be referred to as a host. The host resource 45 may also be referred to as a host processing resource. The host resource 45 is configured to perform higher level network communication protocol functions like networking and transport. The host resource may comprise any suitable processing circuitry, and may comprise hardware, software or any suitable combination of hardware and software.

In some embodiments, the transceiver 20 is considered to be an access point or to form part of an access point.

In other embodiments, the host resource 45 is provided separately from the transceiver components of OWC transmitter optical front end module 30, OWC receiver optical front end module 38, motion sensor 26 and baseband apparatus 36.

Although schematically shown as a separate component in FIG. 2, in some embodiments, the controller 28, or at least part of the controller 28, is provided as part of the host resource 45.

OWC transmitter optical front end module 30 has a light transmitter 32 and transmitter optical front end circuitry 34 for producing optical wireless communication signals for transmission by the light transmitter 32. Any suitable circuitry may be used in embodiments, for example, any circuitry for providing suitably modulated signals in accordance with a Li-Fi protocol or other OWC communications protocol.

In FIG. 2, the OWC transmitter optical front end circuitry 34 has driver circuitry associated with light transmitter 32. The driver circuitry is in communication with the baseband apparatus 36 that performs signal processing.

The OWC transmitter optical front end circuitry 34 also has additional circuitry for example, conditioning, filtering, equalization and/or amplifying circuitry. The light transmitter 32 is configured to be driven by a driving signal, from the driver circuitry, to produce modulated optical signals.

It will be understood that the light transmitter 32 includes any suitable light source configured to transmit modulated light signals. The light source can be a light emitting diode (LED), for example, microLEDs, or a laser, for example, a vertical-cavity surface-emitting laser (VCSEL). The light source is configured to transmit light having a first wavelength. The light source may transmit visible or non-visible light. In some embodiments, more than one light source configured to transmit light having different wavelengths is provided.

The baseband apparatus 36 receives digital data from the host resource 45 and provides analogue signals to the OWC transmitter optical front end 30. A digital to analogue converter (not shown) is provided within the baseband apparatus 36 to convert digital signals of the host 45 to analogue signals for the OWC transmitter optical front end 30. The baseband apparatus 36 modulates the received data onto a drive current and the driving circuitry of the transmitter optical front end circuitry 34 provides the drive current to the LED or laser. The LED or laser then produces an outgoing modulated optical wireless communication signal that carries the data.

The transmitter optical front end circuitry 34 may also be referred to as transmitter circuitry.

Although in the above described embodiment, the analogue to digital and digital to analogue converters are provided as part of the baseband apparatus, these may also be provided separately in other embodiments.

Receiver optical front end module 38 has a photodetector 40 and associated receiver optical front end circuitry 42. The receiver optical front end circuitry 42 is in communication with the baseband apparatus 36. The receiver optical front end circuitry 42 may also be referred to as receiver circuitry.

The photodetector 40 may be one of: a PIN diode, an Avalanche Photo Diode (APD), a Silicon Photomultiplier (SiPM) or similar. Although referred to as a photodetector, the photodetector 40 can be a single photodetector or a plurality of photodetectors. In some embodiments, the plurality of photodetectors are arranged in an array or a matrix.

The photodetector 40 is configured to receive light and convert the received light into an electronic detection signal.

The receiver optical front end circuitry 42 is arranged to be in electrical communication with the photodetector 40 such that detection signals can be received by the receiver optical front end circuitry 42.

The receiver optical front end circuitry 42 is configured to receive electrical signals from the photodetector 40 and pass these electrical signals to the baseband apparatus 36 for demodulating. The receiver optical front end circuitry 42 processes the detection signal from the photodetector 40 and produces receiver signals. Processing of this signal includes conditioning, which may include one or more filter steps; amplification of a weak electrical signal and/or equalisation of received signals. Therefore, the receiver optical front end circuitry 42 produces and transmits an analogue detector signal.

An analogue to digital converter in the baseband apparatus 36 is also provided to receive the analogue detection signal and perform an analogue to digital conversion process. The baseband apparatus 36 then performs a demodulating or decoding process on the digital signals.

In the above described embodiments, the signal monitoring circuitry is described as part of the controller 28 and is configured to monitor output from the motion sensor 26 and/or at least one of the photodetector 40, the receiver optical front end circuitry 42 and the baseband apparatus 36. As described in further detail with reference to FIGS. 6(a) and 6(b), it will be understood that the signal monitoring circuitry may comprise a first signal monitoring circuitry and a second signal monitoring circuitry where the first signal monitoring circuitry is configured to monitor motion sensor signals from the motion sensor and the second signal monitoring circuitry is configured to monitor signals from at least one of the photodetector 40, the receiver optical front end circuitry 42 and the baseband apparatus 36. In some embodiments, the second signal monitoring circuitry is provided as part of the baseband apparatus 36 which signals a detection signal to the host resource 45, and the first signal monitoring circuitry, for monitoring motion sensor signals, is provided as a separate low power controller, for example, a microcontroller. By providing more than one controller, resources used for monitoring sensor signals may be reduced.

In further embodiments, further signal monitoring circuitry is provided, for example, each of the motion sensor 26, the photodetector 40, the receiver optical front end circuitry 42 and the baseband apparatus 36 has associated signal monitoring circuitry.

In the above embodiment, the baseband apparatus 36 processes signals to and from both the transmitter optical front end 30 and the receiver optical front end 38. It will be understood that the baseband apparatus can be provided as two separate components, one associated with the transmitter optical front end module 30 and one associated with the receiver optical front end module 38.

In the present embodiment, the motion sensor 26 is provided as part of the transceiver apparatus 20. As described in further detail below, the motion sensor 26 may be provided as a separate component and/or a separate device coupled to the transmitter optical front end module 30 and/or the receiver optical front end module 38 to provide motion sensor output signals to the transmitter optical front end module 30 and/or receiver optical front end module 38. As described in further detail below, in some embodiments, the motion sensor 26 shares one or more components with the transmitter optical front end module 30 and/or receiver optical front end module 38.

In the present embodiment, the motion sensor 26 is a light sensor that detects motion in the field of view by a change in light intensity. In other embodiments, the motion sensor 26 is one of a passive infrared sensor, a microwave sensor, an ultrasonic sensor, a tomographic sensor, a radar system, a video camera software sensor, a gesture detector. In embodiments, where the transceiver is provided as a subsystem of another system the motion sensor 26 can share one or more components of the system.

In some embodiments, the motion sensor is configured to monitor light reflections from the at least one object in the region about the transceiver. In such embodiments, in the lower power configuration, the motion sensor is configured to produce and transmit light to be reflected by a remote object. The motion sensor then receives reflected signals and determines that motion has been sensed by determining a change in one or more properties in the reflected light. These properties can be: a change in time of flight and/or a change in detected light direction and/or a change in detected light intensity.

The motion sensor 26 is configured to sense motion of an object in a region about the transceiver 20.

Figure 3:
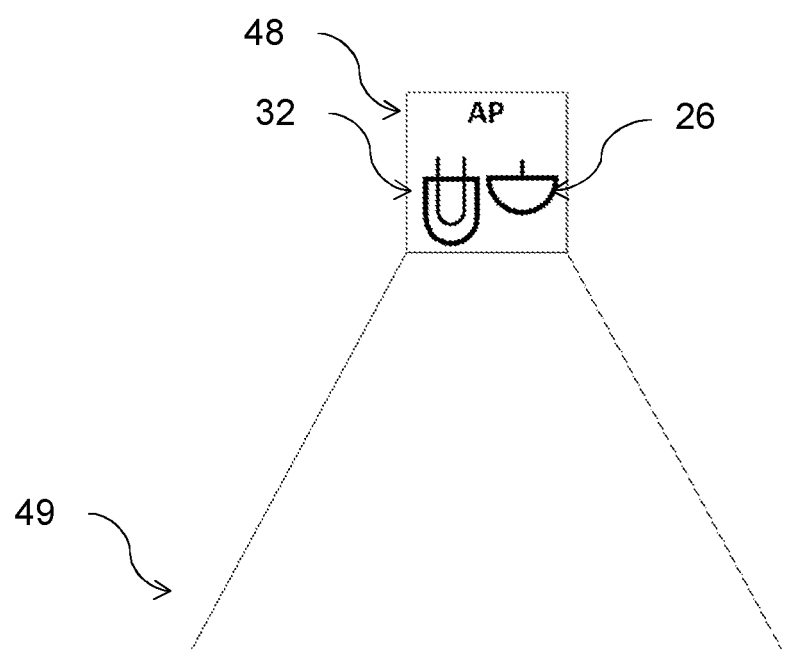
FIG. 3 is a schematic diagram illustrating the field of view of the transceiver apparatus.

FIG. 3 is a schematic illustration of the transceiver provided as part of an access point, indicated by numeral 48, in accordance with the present embodiment. For clarity, the transceiver apparatus 20 is represented in FIG. 3 by the light transmitter 32 and the motion sensor 26. It will be understood that, for clarity, the other components of the transceiver apparatus 20 are also provided but not shown.

As shown in FIG. 3, the light transmitter 32 has a first field of view 49 and is configured to transmit and receive light signals, including modulated optical wireless communication signals into the first field of view.

In the present embodiment, motion sensor 26 is configured to detect motion substantially within the first field of view 49. In other embodiments, the motion sensor 26 is configured to detect motion substantially within a second field of view, the second field of view overlapping with the first field of view 49.

In the present embodiment, the detector (not shown) of the transceiver 20 has a second field of view, that is substantially equal to the first field of view 49 and the detector is configured to detect light that is received from the second field of view. The motion sensor 26 is therefore configured to detect motion that occurs within the second field of view. In the present embodiment, as they are substantially equal, the field of view of the detector and the field of view of the transmitter are referred to as the field of view of the transceiver 20. Therefore, in the present embodiment, the motion sensor 26 is configured to detect motion within the field of view of the transceiver 20.

In other embodiments, the light transmitter 32 is configured to transmit light into a first field of view and the detector is configured to detect light from a second field of view that is not equal to the first field of view of the transmitter. In such embodiments, the motion sensor 26 is configured to detect motion that occurs within either the first or the second field of view. In some embodiments, the first and second fields of view have an overlapping region, and the motion sensor 26 is configured to detect motion that occurs within the overlapping region.

The field of view may be characterised by a range of solid angles, in which case, transmission into a field of view can be described as transmission of a signal in an initial direction that falls within the range of solid angles and reception from a field of view can be described as reception of a signal at final direction that falls within the range of solid angles.

The motion sensor 26 is configured to produce sensor output in response to sensing motion in the field of view of the transceiver 20. It will be understood that the motion sensor 26 can be provided as part of the transceiver 20 or separately. As described in further detail below, the motion sensor 26 may share one or more components with the transmitter and/or receiver optical front end modules.

In accordance with embodiments, the transceiver apparatus 20 can be in a plurality of different power configurations. In accordance with embodiments, the power configurations include a lower power configuration, one or more intermediate power configurations and one or more higher power configurations.

Figure 4:
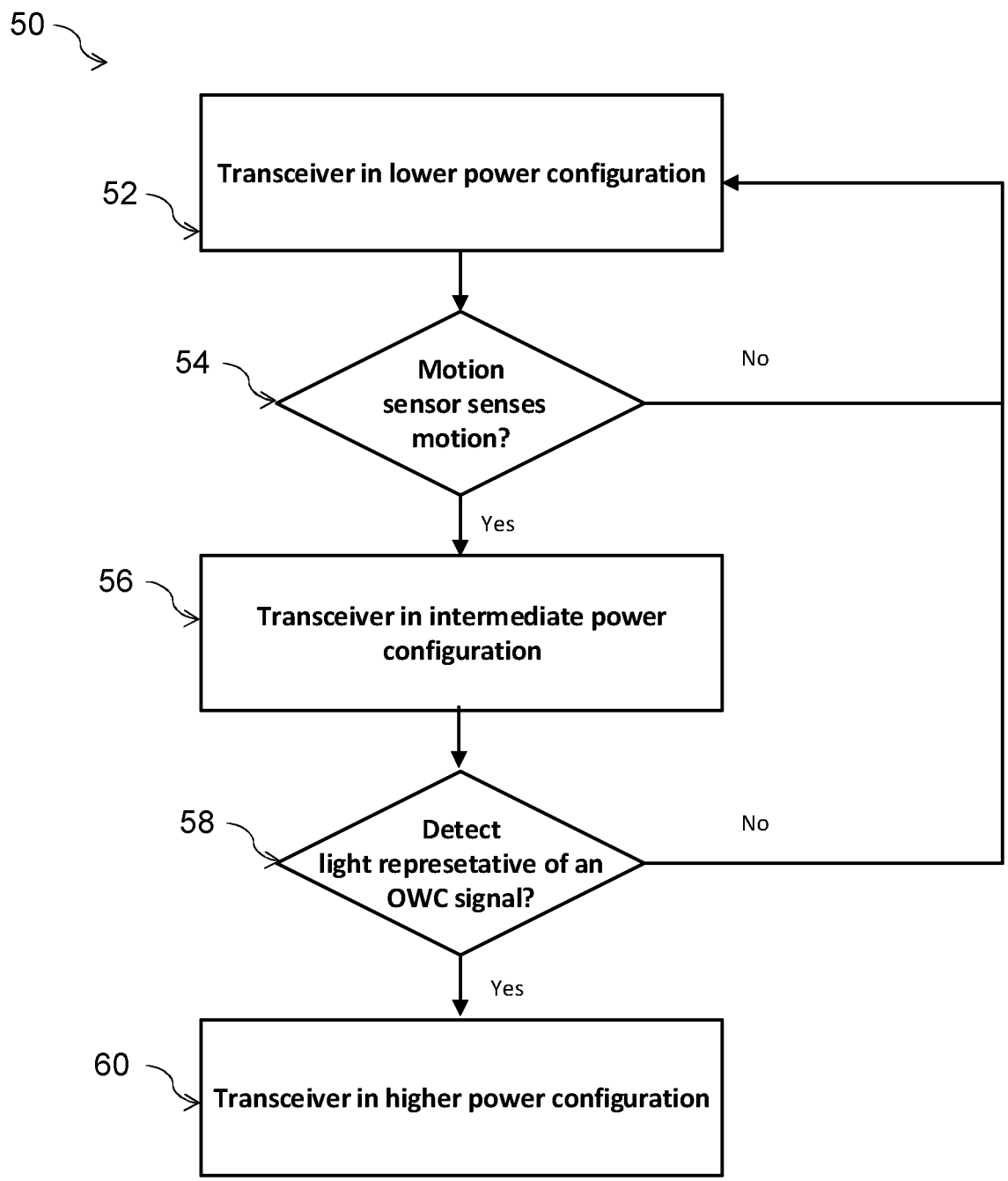
FIG. 4 is a flowchart illustrating a first power up process performed by the transceiver apparatus.
Figure 5:
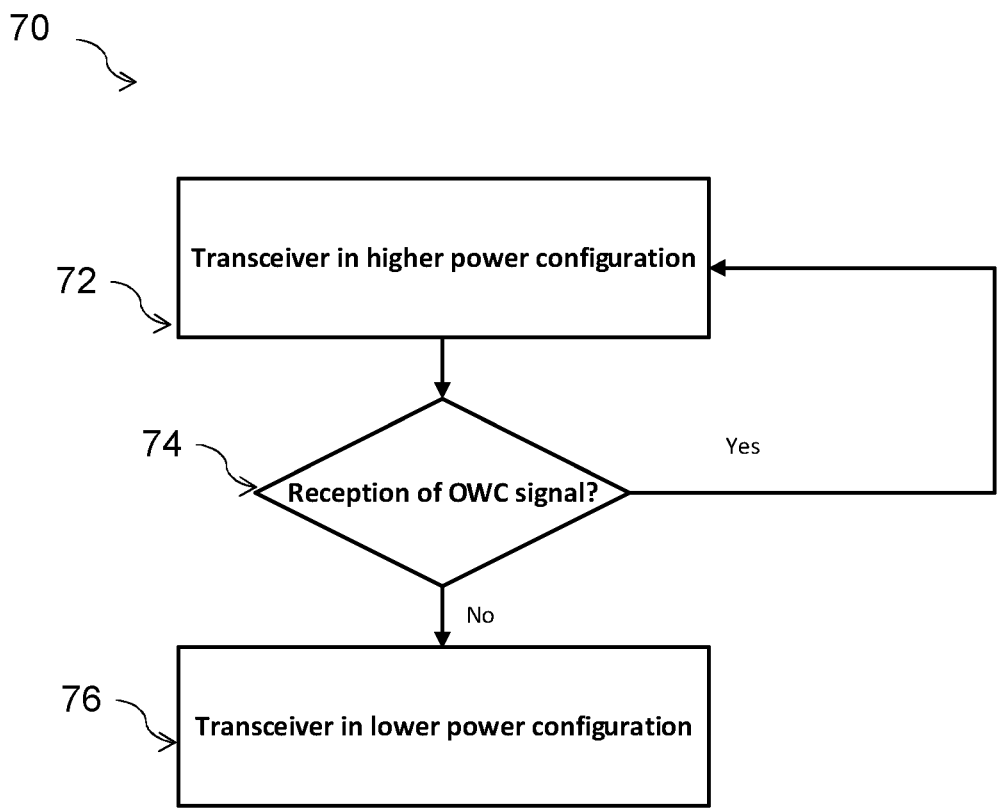
FIG. 5 is a flowchart illustrating a first power down process performed by the transceiver apparatus.

For clarity, the operation of the apparatus of FIG. 2 is described, with reference to FIGS. 4 and 5, for only three operating configurations: a first configuration which corresponds to a lower power configuration; a second configuration which corresponds to an intermediate power configuration and a third configuration which corresponds to a higher power configuration. It will be understood that other power configurations are possible (as described with reference to FIGS. 8 to 12).

The lower power configuration corresponds to all of the components of the transceiver 20 that are configured to receive, transmit and process optical wireless communication signals, including components of the OWC transmitter and receiver optical front end modules, being in a switched off or in a lower power mode.

In the following, it will be understood that although components are described as being in a switched off power state they may also be in a lower power state, for example, a suspended or sleep state.

In the present embodiment, in the lower power configuration, the motion sensor 26 and the controller 28 are in a switched on state such that the motion sensor 26 can sense motion when the transceiver 20 is in the lower power configuration. In the present embodiment, all other components apart from the motion sensor 26 and the controller 28 of the transceiver 20 are in a lower power state and/or in a switched off state when the transceiver 20 is in the lower power configuration.

While in the present embodiment, the controller is described as being in a switched on state in the lower power configuration, it will be understood that in some embodiments, the controller is in a lower power state in the lower power configuration.

In the intermediate power configuration, at least part of the receiver optical front end module 38 is in a higher power state and the other components of the transceiver 20 are in a lower power state. In the intermediate power configuration, the photodetector 40 is turned on and is configured to receive light and produce detection signals in response to the received light. In some embodiments, receiver optical front end circuitry 42 is also turned on to process the detection signals and produce receiver signals. In further embodiments, baseband apparatus 36 is also turned on to perform a decoding or demodulating process on the receiver signals.

In the intermediate power configuration, the signal monitoring circuitry of the controller 28 is configured to monitor one or more outputs from the photodetector 40, the receiver optical front end circuitry 42 and/or the baseband apparatus 36. These outputs may correspond to one or more of the produced detection signals and/or the produced receiver signals and/or output from the baseband apparatus 36. These outputs are monitored to determine that the light received by the photodetector 40 is representative of an optical wireless communication signal.

Any suitable techniques are used in embodiments to determine whether the received light is representative of an optical wireless communication signal. For example, any suitable techniques as described in UK Patent Application No. 1720440.5, the contents of which are hereby incorporated by reference, may be used.

In some embodiments the controller 28, or any other suitable component, monitors detection signals from the photodetector 40 for the presence of at least one amplitude and/or frequency and/or duration signature in the detection signals. Monitoring for the presence of the signal having at least one predetermined property may comprise monitoring for the presence of at least one carrier and/or sub-carrier. In some embodiments, the signal having at least one predetermined property may comprise a sinusoidal signal and/or a binary phase shift keying (BPSK signal). In some embodiments, the signal may comprise at least one tone that has a value of amplitude above a predetermined threshold amplitude value. In some embodiments, the signal may comprise at least one tone that has a value of duration above a predetermined threshold duration value.

Without reference to a specific modulation scheme, a sub-carrier of a multi-carrier scheme may be selected to carry a wake-up tone. For example, a pilot or data sub-carrier can be selected to carry a wake-up tone. The sub-carrier may be selected to carry a sinusoidal signal and/or a binary phase shift keying (BPSK).

In some embodiments, the wake-up tone can be allocated to a sub-carrier toward a lower end of the signal bandwidth. In that case, a low-bandwidth, low-power receiver can be used to detect the tone. Alternatively, or in addition, a wake-up tone can be allocated to a sub-carrier toward a higher end of the signal bandwidth. In this case, information about the speed of the channel can be extracted. By allocating a wake-up signal towards the higher end of the signal bandwidth, the channel has to incorporate lower frequency information. Therefore, frequency of the wake-up subcarrier gives you information of the minimum channel bandwidth.

No demodulation of the received optical signal may be necessary to determine if there is activity on the optical channel in some embodiments.

In some embodiments, no additional modification or additional modulation of the optical signal is required at the transmitter end and the predetermined property is part of the modulated optical signal. In some embodiments, there is no requirement for additional modification or additional modulation of the optical signal beyond the modulation already required for optical communication and the at least one property is related to the choice of modulation scheme used for the optical signals. The property may be at least one carrier or a sub-range of frequencies having an amplitude or duration above a certain value. The carrier may be one or more sub-carriers. The sub-carrier(s) may be pilot sub-carriers or data sub-carriers.

In other embodiments, additional modulation may be performed on the optical signal at the transmitter end such that the at least one predetermined property is included in the transmitted optical signal. For example, a wake-up tone can be modulated onto the optical signal in addition to the communication data. In some of these embodiments, further demodulation/decoding circuitry may be provided to demodulate or decode the optical signal to retrieve the wake-up tone.

In the higher power configuration, substantially all the components of the transceiver 20 that are associated with performing optical wireless communication are in their switched on power state. In the present embodiment, the higher power configuration corresponds to the access point being fully switched on. In the higher power configuration, the transceiver 20 is configured to receive and transmit optical wireless communication signals and perform full-duplex optical wireless communication.

The controller 28 is coupled to the OWC receiver optical front end module 38, to the OWC transmitter optical front end module 30, the motion sensor 26 and the baseband apparatus 36 and is configured to move the transceiver 20 between the one or more power configurations by sending control signals to the respective modules and components. The controller 28 is configured to move the transceiver 20 between different power configurations based on the said motion sensor output and/or the output of one or more other modules and components of the transceiver 20. The controller 28 moves the transceiver 20 between different power configurations by providing control signals to the one or more of the components of the transceiver 20 thereby switching the one or more components between power states.

In the present embodiment, the controller 28 is configured to move the transceiver 20 between different power configurations based on the motion sensor output. However, in some embodiments, the controller 28 is configured to move the transceiver 20 between different power configurations based on the motion sensor output and/or the output of one or more other modules and components of the transceiver. As a non-limiting example, moving the transceiver between different power configurations may be based on detection signals and/or receiver input and/or receiver signals and/or signals from the baseband apparatus and/or signals from the transmitter representative of the transmitter sending data.

The operation of the transceiver 20, in use, is described with reference to the flowcharts illustrated in FIGS. 4 and 5. In particular, FIG. 4 describes a typical switch on or power-up sequence that is performed by the transceiver 20 in the event that the motion sensor 26 senses motion. FIG. 5 describes a typical switch off or power-down sequence that is performed by the transceiver 20. Further power-up sequences for transceivers in accordance with further embodiments are shown in FIGS. 8 to 12.

FIG. 4 is a flowchart illustrating a power-up method 50 that is performed by transceiver 20.

At step 52, the transceiver 20 is provided in the lower power configuration. In the lower power configuration, as described above, the motion sensor 26 and the controller 28 are in a switched on state.

At step 54, the motion sensor 26 senses motion of an object in the field of view 49 of the transceiver 20. The motion sensor 26 thus produces a motion sensor signal, or makes a change in the motion sensor output, in response to sensing this motion.

At step 56, the controller 28 which is monitoring the motion sensor output, detects the motion sensor signal or change in motion sensor output. The controller 28 then provides control signals to the OWC receiver optical front end module 38 and/or baseband apparatus 36 to turn at least part of the OWC receiver optical front end module 38 and/or baseband apparatus 36 on. In particular, in the present embodiment, the photodetector 40 and receiver optical front end circuitry 42 and optionally the baseband apparatus 36 are turned on using control signals. The controller 28 thus places the transceiver 20 into an intermediate power configuration. The controller 28 also provides a control signal to the motion sensor 26 to turn the motion sensor off.

At step 58, the controller 28 and/or baseband apparatus 36 processes one or more signals to determine if the light received is representative of an optical wireless communication signal. The controller 28 and/or baseband apparatus 36 receives the detection signals or part of the detection signals and determines whether the detector is receiving light that is representative or indicative of activity on the optical channel.

If the transceiver 20 has detected light representative of an optical wireless communication signal at step 58, the method continues to step 60, which comprises the controller 28 and/or the baseband apparatus 36 sending control signals to the receiver optical front end module 38 and/or the transmitter optical front end module 30 to move the transceiver 20 from the intermediate power configuration to the higher power configuration.

When in the higher power configuration, the transceiver 20 is operable to perform full-duplex OWC communication with a remote device.

If the transceiver 20 has not detected light representative of an optical wireless communication signal, as established at step 58, the method continues back to step 52, and the controller 28 and/or the baseband apparatus 36 moves the transceiver 20 from the intermediate power configuration to the lower power configuration. The steps taken at step 56 to place the transceiver 20 in an intermediate power configuration are then reversed. In particular, the components and modules of the transceiver 20 that have been turned on at step 56 are then turned off.

In the above embodiments, at step 58, it is described that a control signal is sent to the motion sensor 26 to turn it off. In some embodiments, the motion sensor is a low power motion sensor and the motion sensor is not turned off when the controller is moved to the intermediate power configuration.

It will be understood that, in some embodiments, in the case of detected movement without detection of an OWC signal, the transceiver will continuously move between the lower power configuration and the intermediate power configuration. In particular, the transceiver will move through steps 52 to 58 and back to step 52.

FIG. 5 shows a flowchart illustrating a typical shut down or switch off procedure 70. The procedure of FIG. 5 may be performed immediately after the completion of the procedure of FIG. 4. In some embodiments, the method of FIG. 5 may be performed after a pre-determined time period following the completion of the method of FIG. 4.

At step 72, the transceiver 20 is provided in the higher power configuration.

At step 74, the controller 28 and/or the baseband apparatus 36 determines, by monitoring output from the receiver optical front end circuitry 42 and/or the photodetector 40, if the transceiver 20 is still receiving OWC signals. If the controller 28 and/or the baseband apparatus 36 determines that the transceiver 20 is still receiving OWC signals, then the transceiver 20 remains in the higher power configuration.

In particular, by monitoring the output signals, controller 28 and/or baseband apparatus 36 can determine that the monitored output is indicative that the detector has not received light representative of at least one of: an optical wireless communication protocol signal or activity on an optical channel. It will be understood that this step can be carried out by monitoring outputs from receiver optical front end circuitry 42 and/or photodetector 40 and/or baseband apparatus 36. As a first non-limiting example, this step may include determining that light received by the photodetector 40 is below a threshold level by monitoring the detection or receiver signals or at least part of the detection or receiver signals. As a second non-limiting example, this step may include determining that no detection or receiver signals have been produced for a pre-determined time period. As third non-limiting example, this step may include receiving an end transmission signal as part of the optical signal.

In further embodiments, it may be determined that the transceiver is no longer receiving OWC signals by monitoring for outputs from receiver optical front end circuitry 42 and/or the photodetector 40.

At step 76, the controller 28 moves the transceiver 20 into a lower power configuration in response to the controller and/or the baseband apparatus 36 determining that the transceiver 20 is no longer receiving OWC signals. In the present embodiment, the photodetector 40, receiver optical front end circuitry 42 and baseband apparatus 36 are turned off by control signals. In the present embodiment, the light transmitter 32 and transmitter optical front end circuitry 34 are turned off by control signals. The controller 28 thus places the transceiver 20 into the low power configuration by providing a control signal to the motion sensor 26 to turn the motion sensor on.

In the above described embodiment, a transceiver 20 with a motion sensor 26 is described. The motion sensor 26 can be provided as a separate component or the motion sensor 26 can be provided as having one or more shared component with the transmitter optical front end 30 and/or the receiver optical front end 38.

Figure 6A:
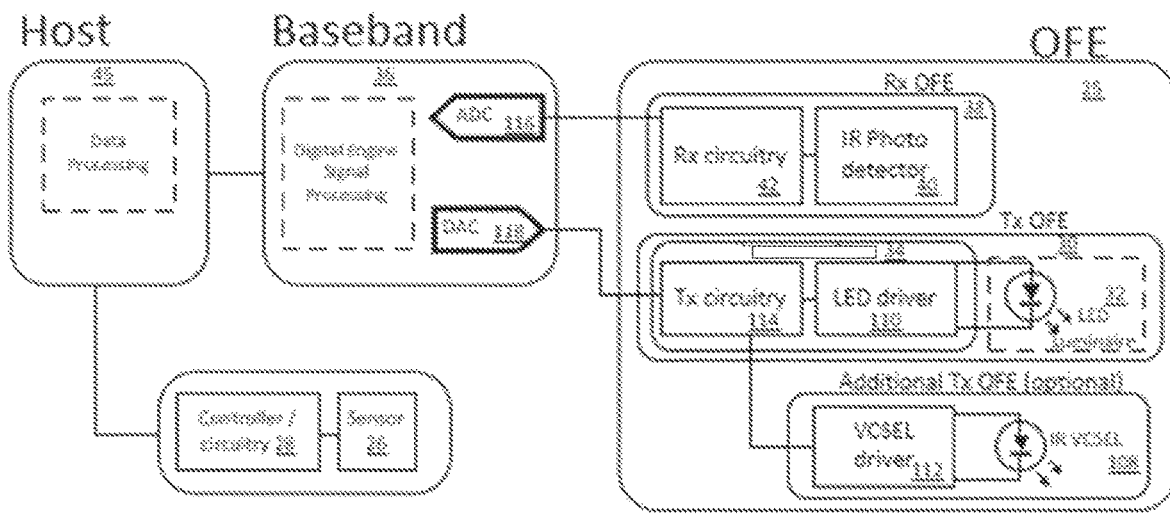
FIG. 6(*a*) shows a first transceiver apparatus having a motion sensor in accordance with embodiments and FIG. 6(*b*) shows a second transceiver apparatus having a motion sensor in accordance with embodiments.
Figure 6B:
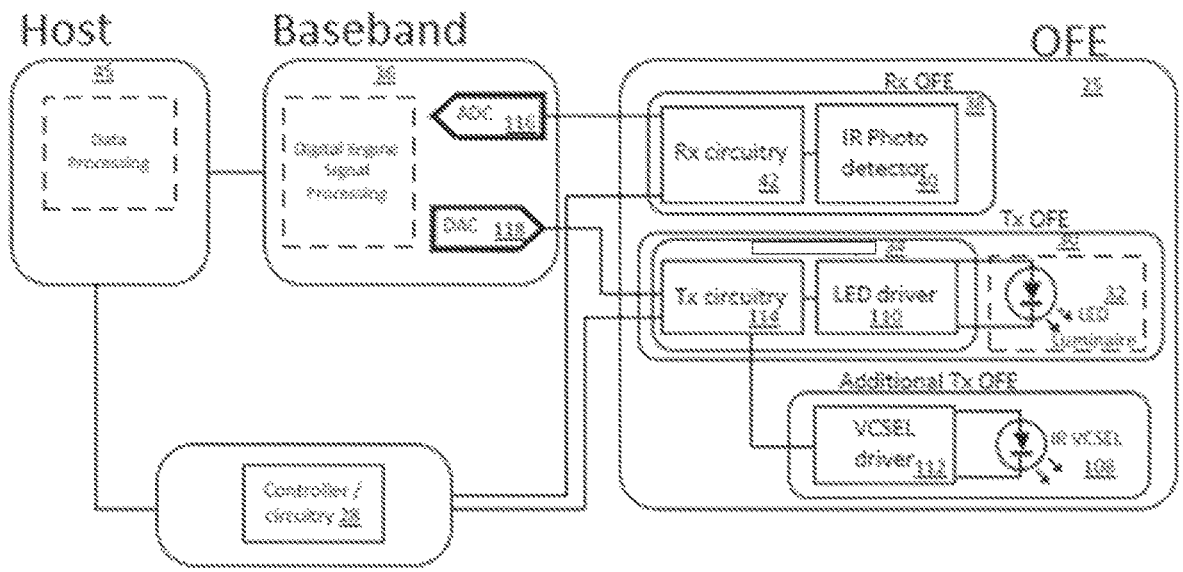

FIGS. 6(a) and 6(b) illustrate a first transceiver with a separate motion sensor 26 and controller 28 and a second transceiver with a separate controller 28, respectively. The transceiver of FIG. 6(b) has an integrated motion sensor provided by optical front end components of the transceiver.

The first and second transceivers each have a host resource 45, which may be referred to as a host, and a baseband apparatus 36, substantially as described with reference to FIG. 2. The baseband apparatus 36 may also be referred to as a baseband. Each transceiver has an optical front end 25 that includes the components of receiver optical front end module 38 and transmitter optical front end module 30, as described with reference to FIG. 2. In particular, the optical front end 25 has an infrared photodetector as the photodetector 40 (a photodetector configured to detect infrared light) with associated receiver optical front end circuitry 42. The optical front end 25 also has two light sources: an LED the light transmitter 32 and an additional light emitting device in the form of an infrared VCSEL 108 with respective associated drivers: an LED driver 110 as part of the transmitter optical front end circuitry 34 and an additional VCSEL driver 112. The drivers are coupled to associated transmitter circuitry 114, also part of the transmitter optical front end circuitry 34.

Also shown in FIGS. 6(a) and 6(b) is the analogue to digital converter 116 that converts analogue signals from the receiver circuitry to digital signals as part of the baseband apparatus 36. The transceivers also have a digital to analogue converter 118 as part of the baseband apparatus 36 for converting digital signals from the baseband to analogue signals for the transmitter circuitry. In some embodiments, the analogue to digital converter 116 and the digital to analogue converter 118 are provided separately from the baseband apparatus 36.

The first transceiver, shown in FIG. 6(a), has a motion sensor 26 that is electronically coupled to the host resource 45 via the controller 28.

In FIG. 6(a) the controller 28 receives motion sensor signals from the motion sensor 26 and performs further control actions based on the received motion sensor signals.

The motion sensor is a separate sensor component provided as part of the transceiver or as part of the access point.

The motion sensor 26 provides output to the controller 28 which communicates with the host resource 45. As described above, the controller 28 has signal monitoring circuitry for monitoring output from the motion sensor 26.

The motion sensor 26 and/or controller 28 provides digital output to the host 45 indicative of motion being detected. The motion sensor 26 and/or controller 28 provides a signal at a first level (for example a digital 0 signal) when no motion is detected and a signal at a second level (for example a digital 1 signal) when motion is detected. The controller 28 receives this signal and then sends control signals to the host resource 45 to move the transceiver into a different power configuration. In some embodiments, separate signal monitoring circuitry is provided for monitoring signals from the baseband apparatus 36 and/or one or more components of the optical front end 25.

The second transceiver, shown in FIG. 6(b) has the controller 28 coupled to components of the optical front end 25. As such, the second transceiver can be considered to have a motion sensor that shares components with the optical front end 25. The second transceiver thus uses components that are already provided as part of the transceiver to provide motion sensing functionality.

Similarly to the motion sensor 26 and controller 28 configuration of FIG. 6(a), the controller 28 of FIG. 6(b) provides a digital output indicative of motion being detected. In particular, signal monitoring circuitry of the controller 28 monitors signals from the photodetector 40 and receiver optical front end circuitry 42 of the optical front end 25. In some embodiments, the controller 28 controls the light transmitter 32 and transmitter optical front end circuitry 34 to transmit a motion sensing signal to be received on reflection by the photodetector 40. Based on the monitored signal, the controller 28 determines that motion has been sensed.

The controller 28 provides a signal at a first level (for example a digital 0 signal) when no motion is detected and a signal at a second level (for example a digital 1 signal) when motion is detected. The controller receives this signal and then sends control signals to move the transceiver into a different power configuration, as described in further detail below.

Figure 7:
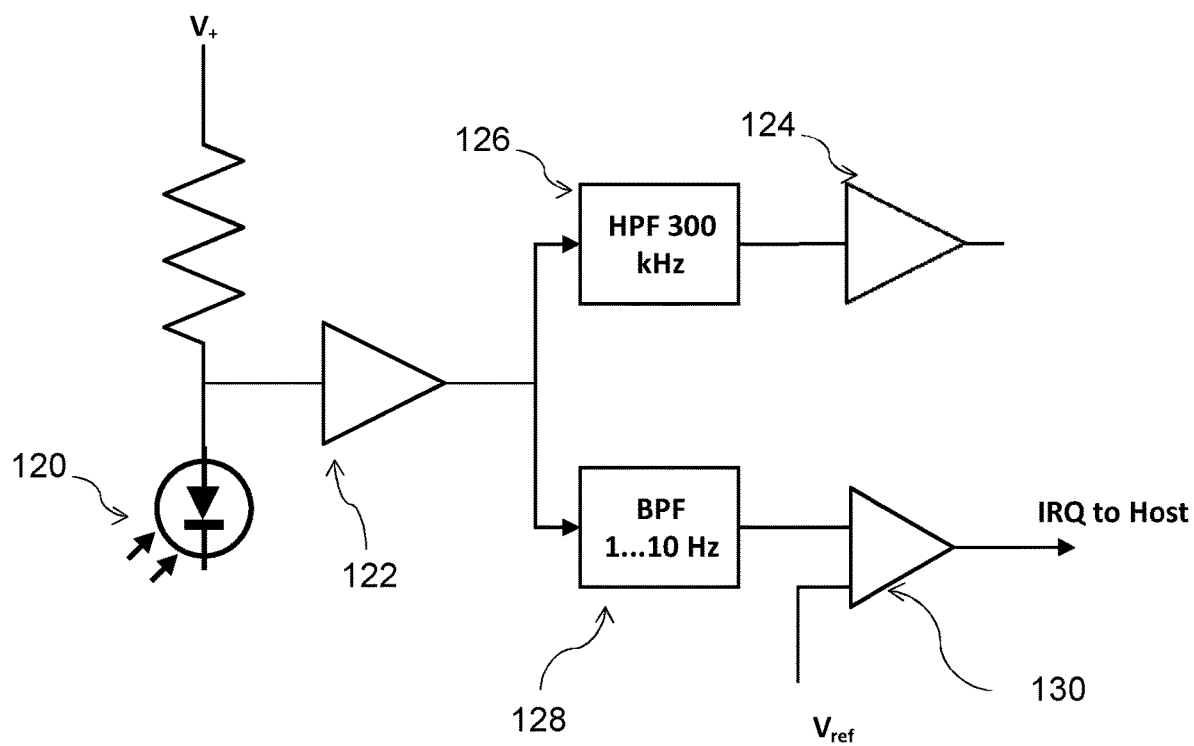
FIG. 7 shows a transceiver apparatus with an integrated motion sensor.

A non-limiting example of a transceiver that has a motion sensor module with shared components is shown in FIG. 7.

FIG. 7 shows a motion sensor using part of a receiver optical front end module 38 of a transceiver for motion sensing in accordance with embodiments. FIG. 7 shows the receiver optical front end circuitry 42 associated with a photodetector 40. The receiver optical front end circuitry 42 has a front end amplifier 122, a first filtering component 126 and a second stage amplifier 124 which communicates signals from the optical front end to the analogue to digital converter 116 in the baseband 36.

The first filtering component 126 is a high pass filter coupled to the optical front end such that detection signals with frequencies above a first threshold, in this embodiment the first threshold is 300 kHz, are passed to the baseband processor. The first threshold is selected so that signals with frequencies that are characteristic of optical wireless communication signals are passed to the baseband processor.

The second filtering component is a bandpass filter 128 that allows detection signals with frequencies in a low frequency window (in this embodiment, between 1 to 10 Hz) to pass. These low frequency signals are indicative of sensed motion. The signals that pass the bandpass filter 128 are provided to a further signal processing component that provides a digital signal to the controller 28 (provided as part of the host or as a separate controller) in response to a signal passing through the bandpass filter 128. In the present embodiment, the further signal processing component is an operational amplifier 130 acting as a voltage comparator, with a first input being the analogue signals that have passed through the bandpass filter and a second input being a reference voltage. The output is a digital signal for the controller 28. The digital signal output can be considered as the motion sensor output.

In the embodiment shown in FIG. 7, the photodiode 120, the front end amplifier 122, the bandpass filter 128 and the operation amplifier 130 can be considered as a motion sensor. It will be understood that in other embodiments, other combinations of components can be used to provide functionality of a motion sensor.

In the lower power configuration of the transceiver shown in FIG. 7, the motion sensor module components (the photodiode 120, front end amplifier 122, bandpass filter 128 and op-amp 130) are switched on and the other components shown in FIG. 7 (the high pass filter 126, the OFDM receiver 124 together with the baseband processor and the transmitter components) are in a switched off or in a lower power mode.

In the intermediate power configuration, the high pass filter 126, the second stage amplifier 124 and the baseband processor are switched on, so that the controller 28 is operable to determine if light detected is representative of an optical wireless communication signal.

In the above described embodiments, in the intermediate power mode, the controller 28 monitors output to determine if the detector has detected light that is representative of an optical wireless communication signal. In further embodiments, further described with reference to FIGS. 8 to 12, the controller 28 is configured to move the transceiver 20 to one or more further intermediate configurations. These further intermediate configurations include switching on one or more components of the transmitter optical front end module 30 and the receiver optical front end module 38, so that the transmitter and receiver optical front end modules can perform a beacon signal process, described below, or other device sensing process with a remote device.

In some embodiments, the beacon signal process is performed in place of or as part of, step 58 of the method illustrated in FIG. 4. In further detail, the transceiver is configured to perform a beacon signal process to determine that a remote device is an OWC device. In some embodiment, the transceiver is configured to perform a beacon signal process to determine that a remote device is a remote device seeking to communicate specifically with the transceiver.

Figure 8:
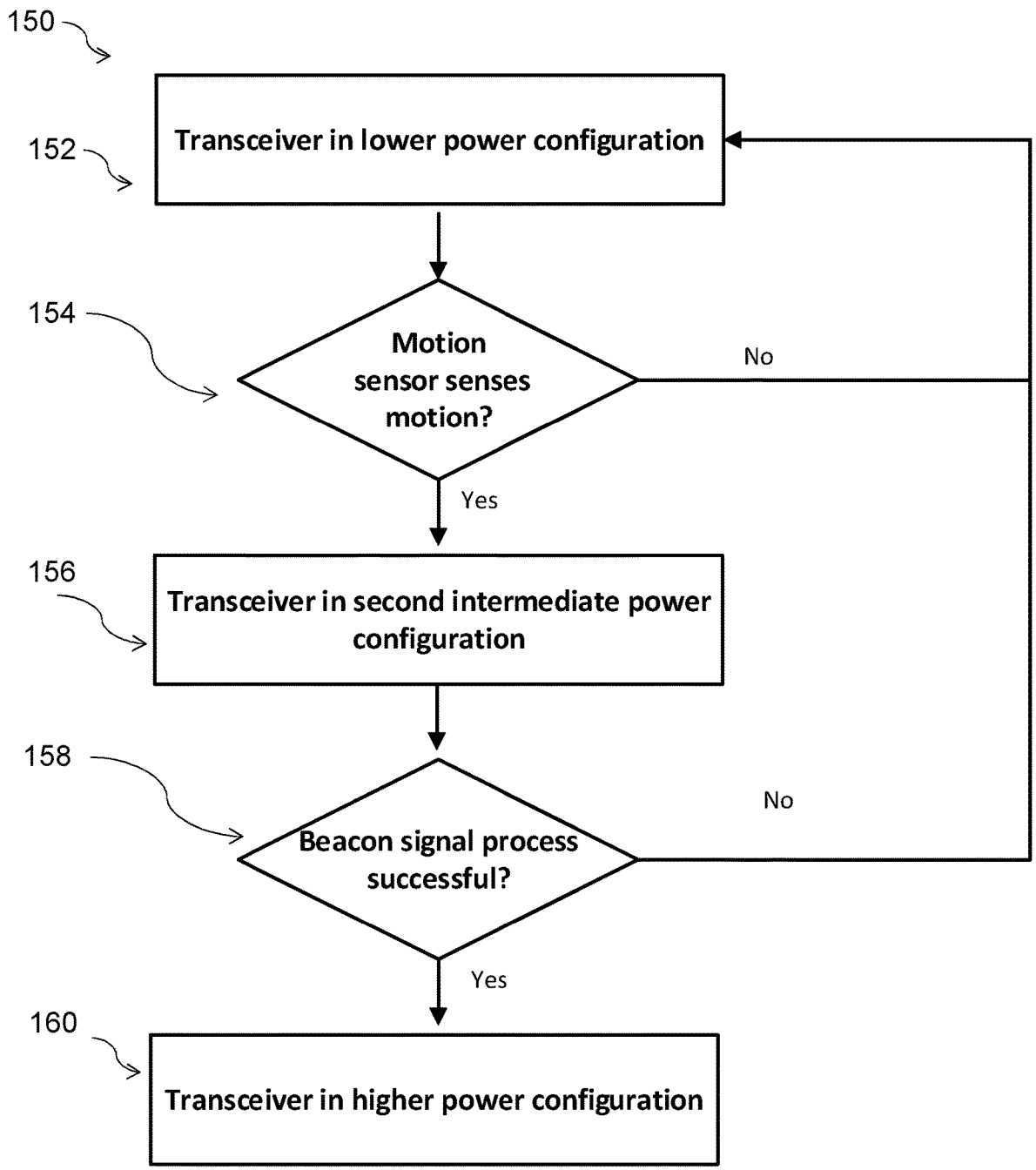
FIG. 8 is a flowchart illustrating a second power up process performed by a transceiver apparatus in accordance with embodiments.

FIG. 8 shows a flowchart 150 of a typical switch on procedure, in accordance with embodiments, that includes a beacon signal process. FIG. 8 shows a procedure with a lower power configuration, an intermediate power configuration (referred to as a second power configuration) and a higher power configuration. Steps 152 and 154 of FIG. 8 correspond to steps 52 and 54 of flowchart 50, illustrated in FIG. 4 and these steps are performed as described with reference to FIG. 4.

At step 156, in response to the motion sensor 26 sensing motion at step 154, the controller 28 provides control signals to the OWC receiver optical front end module 38 and/or baseband apparatus 36 thereby to place the transceiver 20 into a second intermediate power configuration. The controller 28 also provides control signals to the motion sensor 26 to turn the motion sensor off.

At step 158, the transceiver 20, in the second intermediate power configuration, performs a beacon signal process. This includes transmitting a beacon signal into the field of view of the transceiver 20. On receiving the beacon signal, a remote optical wireless device (a station) in the field of view will process the beacon signal and in response, send a response signal back to the transceiver 20. Step 158 also includes the transceiver 20, in the second intermediate power configuration, monitoring for a response signal from the remote device.

If the transceiver 20 detects light representative of an optical wireless communication beacon response signal, the method continues to step 160, which comprises the controller 28 and/or the baseband apparatus 36 sending control signals to the receiver optical front end 38 and/or the transmitter optical front end 30 and/or baseband apparatus 36 to move the transceiver 20 from the second intermediate power configuration to the higher power configuration.

If the transceiver 20 does not detect light representative of an optical wireless communication beacon response signal at step 158, the method continues back to step 152, and the controller 28 moves the transceiver 20 from the second intermediate power configuration to the lower power configuration. If no signal is detected at step 158, the steps taken at step 156 to place the transceiver 20 in the second intermediate power configuration are reversed. In particular, the parts of receiver optical front end module 38, and/or the transmitter optical front end module 30 and/or baseband apparatus 36 that have been turned on are then turned off.

On receiving a response signal, the transceiver 20 is then moved to a higher power configuration, as represented by step 160. Step 160 corresponds to step 60 of flowchart 50.

Figure 9:
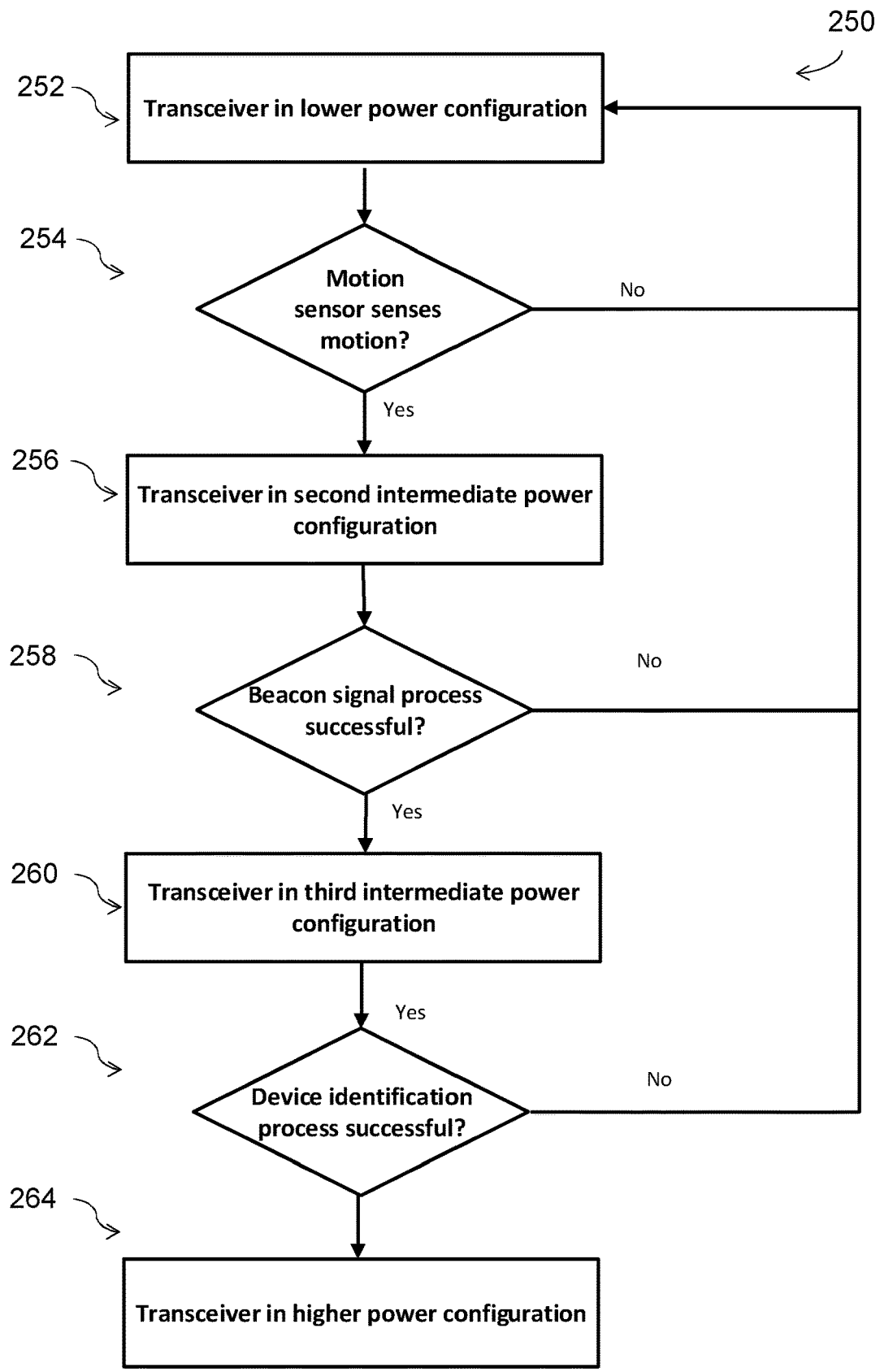
FIG. 9 is a flowchart illustrating a third power up process performed by a transceiver apparatus in accordance with embodiments.

FIG. 9 shows a further flowchart illustrating a method 250 that is performed in accordance with embodiments. In addition to the steps performed in FIG. 8 (in particular steps 252, 254, 256 and 258 which correspond to steps 152, 154, 156 and 158) the method 250 includes a further device identification process that is performed with the remote device. The method 250 relates to moving the transceiver between a lower power configuration, two intermediate power configurations (referred to as second and third intermediate power configurations) and one or more higher power configurations. The second intermediate power configuration corresponds to the second intermediate power configuration of FIG. 8. Depending on the identified type of remote device, the transceiver 20 is moved to one or more different higher power configurations that correspond to different operating modes of the access point.

At step 258, a beacon signal process is performed, substantially as described with reference to FIG. 8. In response to successful completion of the beacon signal process, the transceiver 20 is moved to a further intermediate power configuration (referred to as the third intermediate power configuration) at step 260.

In the third intermediate power configuration the transceiver is configured to perform a low bandwidth device identification process.

At step 262, the transceiver performs a device identification process. In the present embodiment, the device identification process is a handshaking process in accordance with an OWC handshaking protocol. Based on detected signals received during the handshaking process, the transceiver can determine the type of the remote device it is receiving signals from. For example, as described with reference to FIG. 10, the remote device may be a mobile station or an "Internet of Things" (IoT) device.

In response to determining the type of device that is in the field of view, the controller 28 controls the OWC transceiver to move it to one of a number of different higher power configurations. The higher power configuration is selected based on the device identification process. In particular, different types of remote device require different types of OWC communication.

In some embodiments, the power configurations may be substantially the same for different types of device, but the OWC protocol used for communications is different.

As a non-limiting example, communication to some devices, for example monitoring or sensor-type devices, may use a simpler protocol than communication to a user device. However, the hardware and optical front end used to send the OWC signals may be in the same power configuration.

In some embodiments, the transceiver has one or more low-power ADCs and one or more high-power ADCs and different power configurations turn on one of the low-power ADC and one of the high-power ADC. For example, a first higher power configuration for Internet of Things device uses the low-power ADC and a second higher power configuration for LiFi uses the high-power ADC.

Figure 10:
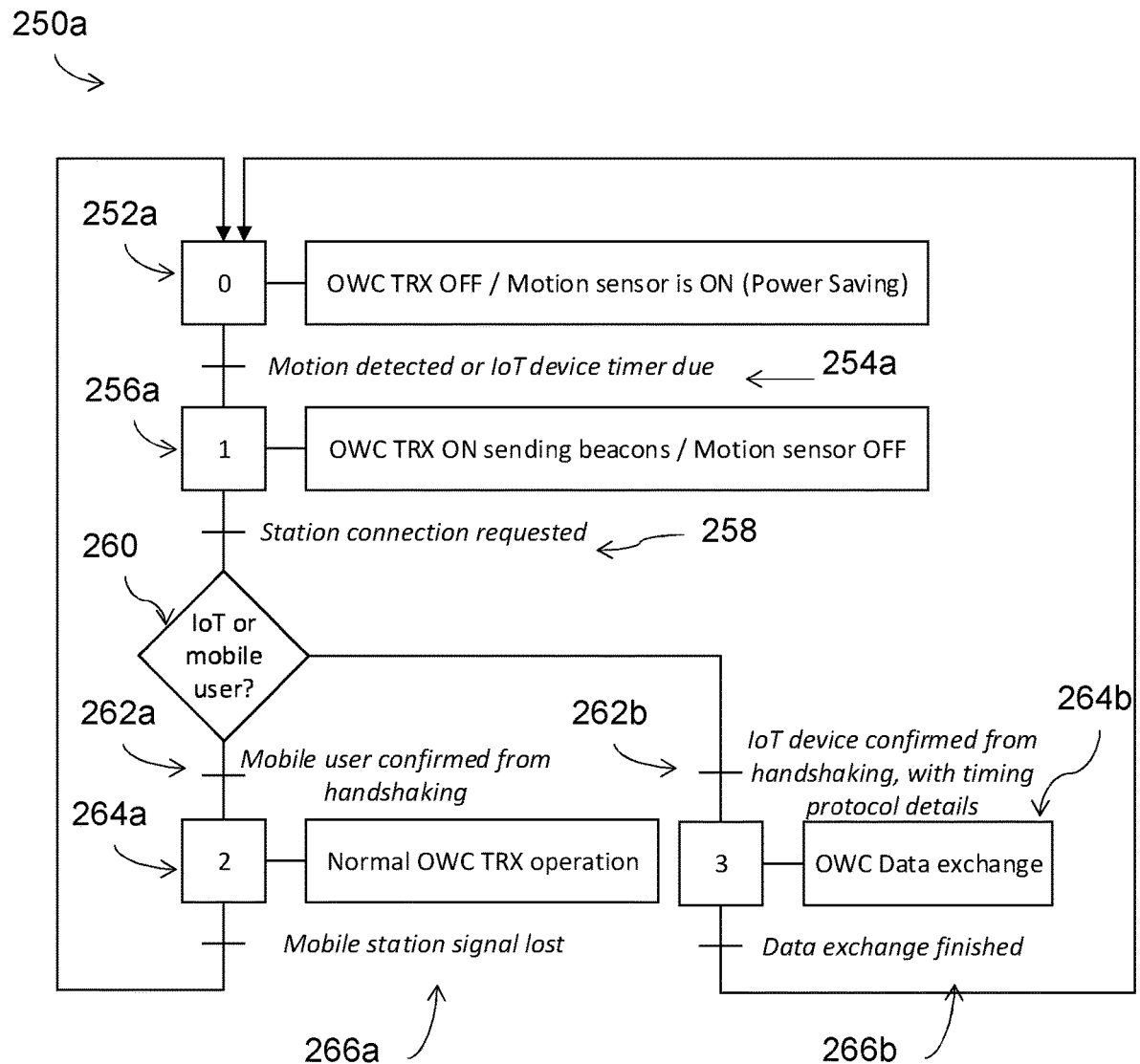
FIG. 10 is a flowchart illustrating a fourth power up process performed by a transceiver apparatus in accordance with embodiments.

FIG. 10 shows a flowchart of a non-limiting example of the method of FIG. 9 in accordance with embodiments. As part of the method 250a of FIG. 10, the transceiver 20 is configured to distinguish between different types of OWC devices, in particular, the different types of OWC devices are an "Internet of Things" device (IoT) and a mobile LiFi data device.

FIG. 10 shows steps corresponding to steps 252, 254, 256, 258, 260, 262 and 264 of the method of FIG. 9.

In further detail, at step 252a, the transceiver is in a lower power configuration in which the OWC transmitter and receiver is turned off and the motion sensor is turned on.

At step 254a, the motion is detected by motion sensor. At step 256a, in response to detecting a motion sensor signal, the controller 28 moves the transceiver to a second intermediate power configuration. The motion sensor is also turned off. At step 258, a beacon signal process is performed. The signal beacon process includes sending beacons and listening for beacon responses using the transmitter and receiver of the transceiver.

In response to performing the beacon process 258, the controller 28 moves the transceiver to a third intermediate power configuration at step 260, where the device identification process is performed using a handshaking protocol. In the present embodiment, the remote device is either a mobile user or an internet of things device.

At step 262a, handshaking confirms that the device is a mobile device. At step 262b, handshaking process confirms that the device is an internet of things device.

Following confirmation that the device is a mobile device, at step 264a, the transceiver is moved to a first higher power configuration.

Following confirmation that the device is an internet of things device, at step 264b, the transceiver is moved to a second higher power configuration.

In the method of FIG. 10, in response to determining that the remote device is a mobile OWC device, at step 264a, the transceiver 20 is moved to a first higher power configuration (labelled "normal OWC TRX operation"), in which normal OWC transceiver communication is performed. In response to determining that the remote device is a IoT device, at step 264b, the transceiver 20 is moved to a second higher power configuration (labelled "OWC Data exchange").

The OWC communication performed in the first higher power configuration and the second higher power configuration are different in one or more characteristics. For example, one or more of the speed, quantity, quality, frequency, wavelength, timing between signals, is different. In some embodiments, the protocol used for communication is different.

At step 266a, when the mobile station signal is lost, the controller moves the transceiver back to the lower power configuration (back to 252a). At step 266b, when the data exchange is finished, the controller moves the transceiver back to the lower power configuration (back to 252a).

Figure 11:
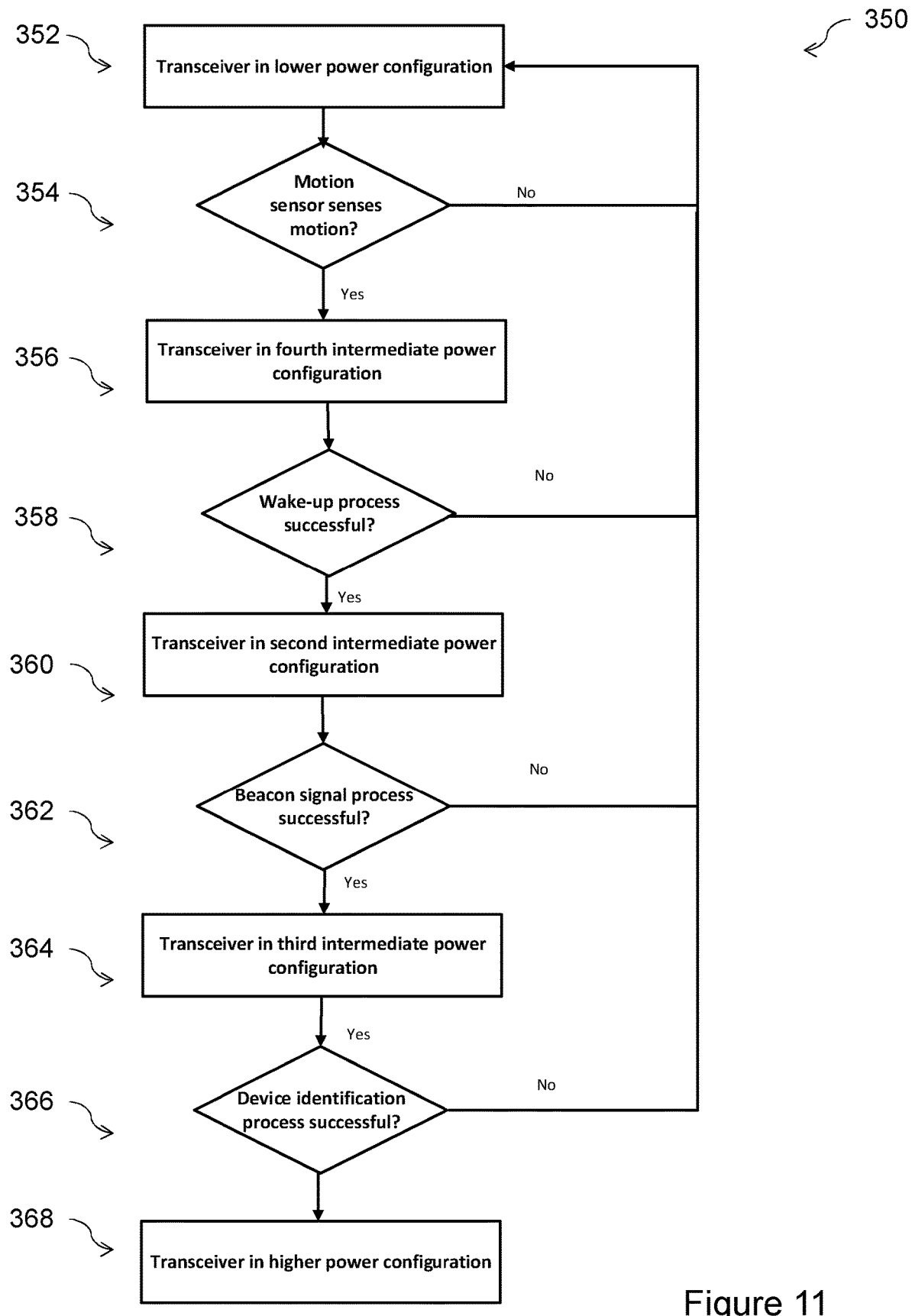
FIG. 11 is a flowchart illustrating a fifth power up process performed by a transceiver apparatus in accordance with embodiments.

FIG. 11 shows a flowchart of a further method with steps in common with the method of FIG. 9. FIG. 11 shows a method relating to moving the transceiver between a lower power configuration, three intermediate configurations (referred to as second, third and fourth intermediate power configurations) and one or more higher power configurations. The second and third intermediate power configurations correspond to the second and third intermediate power configurations of FIG. 9. As described with reference to FIG. 9 and FIG. 10, the transceiver can be placed in one or more higher power configurations following a device identification process.

Step 352 and 354 of method 350 correspond to steps 252 and 254 of FIG. 9. In contrast to the method of FIG. 9, when motion is sensed, the transceiver is first placed into an initial intermediate power configuration (referred to as the fourth intermediate power configuration) in which the transceiver is configured to carry out a wake-up process at step 358. The wake-up process is performed together with a remote device. On successful completion of the wake-up process of step 358 the transceiver is moved from the fourth intermediate power configuration to the second intermediate power configuration.

In further detail, the wake up process includes sending a wake up signal and waiting to receive a response to the wake up signal. On receiving a response to the wake-up signal, the power configuration of the transceiver is moved from the fourth intermediate power configuration to the second intermediate power configuration. The wake-up signal process operates by sending an OWC signal with a certain characteristic.

In FIG. 11, if the wake-up process is successful, the transceiver is then placed in the second intermediate power configuration which corresponds to the second intermediate power configuration of FIG. 9. The remaining steps of FIG. 11 correspond to steps described with reference to FIG. 9. In particular, steps 360, 362, 364, 366 and 368 substantially correspond to steps 256, 258, 260, 262 and 264, respectively.

Performing a wake-up signal before performing the beacon signal process and/or the further device identification process, may save further power resources. For example, the wake-up signal and received response signals may be simpler than a beacon signal or handshaking signal, therefore fewer components of the transceiver are required, or the components can operate in lower power modes, to send and receive these signals. The wake-up signal can be a simple tone signal. In some embodiments, low power wake-up signal generating circuitry is provided for the sole purpose of sending and/or receiving a wake-up signal. In such embodiments, only the wake up circuitry is provided in the initial intermediate power configuration.

Figure 12:
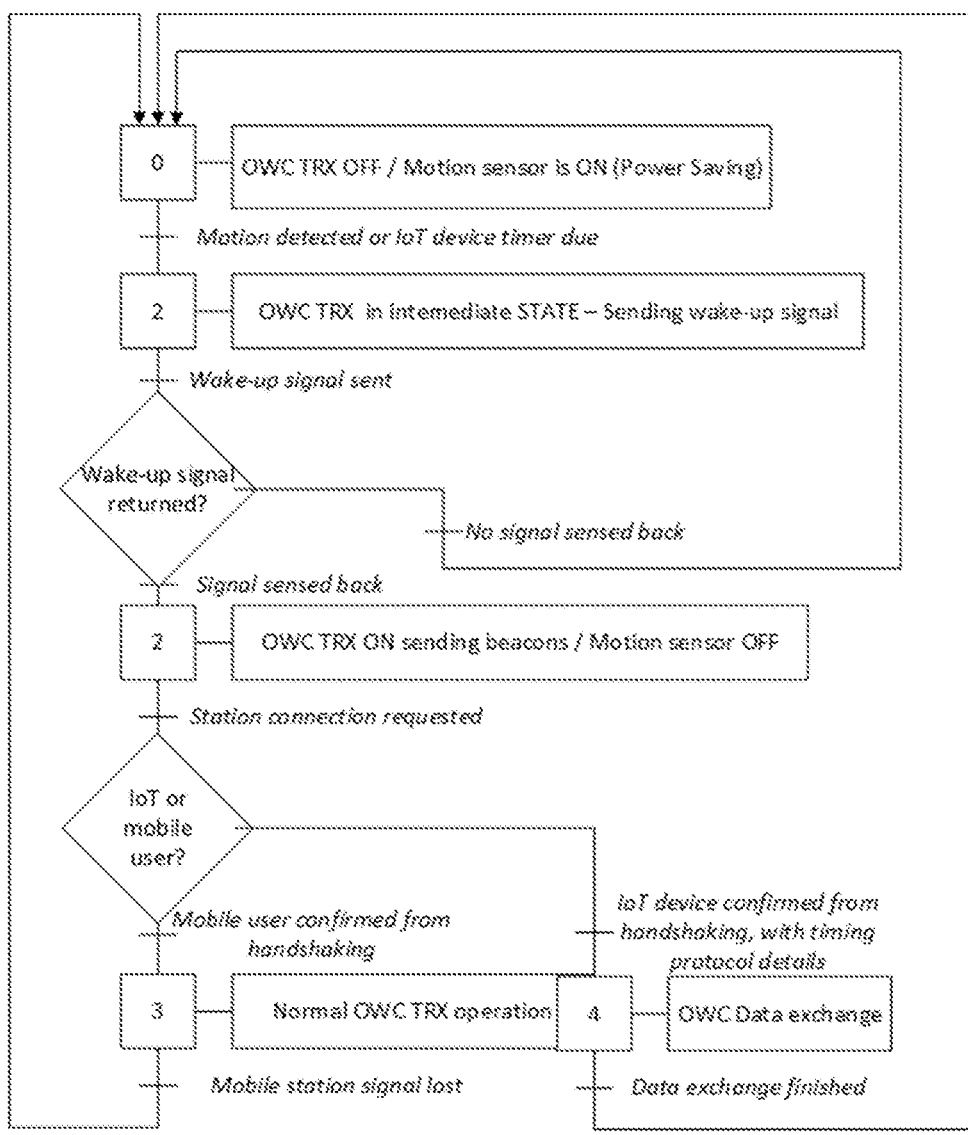
FIG. 12 is a flowchart illustrating a sixth power up process performed by a transceiver apparatus in accordance with embodiments.

FIG. 12 shows a flowchart of a non-limiting example of the method of FIG. 11 in accordance with embodiments. As part of the method 350a of FIG. 12, the transceiver 20 is configured to distinguish between different types of OWC devices, in particular, the different types of OWC devices are an "Internet of Things" device (IoT) and a mobile LiFi data device, substantially as described with reference to FIG. 10.

In further embodiments, it will be understood that certain steps of the above described methods 50, 70, 150, 250, 250a, 350 and 350a can be replaced with other steps of these methods. For example, in place of performing a beacon process at step 158, 258 or 362, a step of detecting if light is representative of an OWC signal can be performed (see step 58 of FIG. 4).

In some embodiments, the device identification process, for example step 366, can form part of the beacon signal process, in that the beacon signal process sends initial beacon signals and receives responses, before performing a handshaking or other device identification process. In these cases, the transceiver can be kept in the same intermediate power mode for these processes.

As a non-limiting example of a further wake-up process, an intermediate power configuration comprises turning on the receiver to check for activity on the channel, for example, substantially as described with reference to step 58 of FIG. 4. In response to detecting activity, a further intermediate power configuration includes turning on the transmitter circuitry to conduct a handshake process with a remote device (station). The intermediate power configuration can include low power ADCs.

Figure 13:
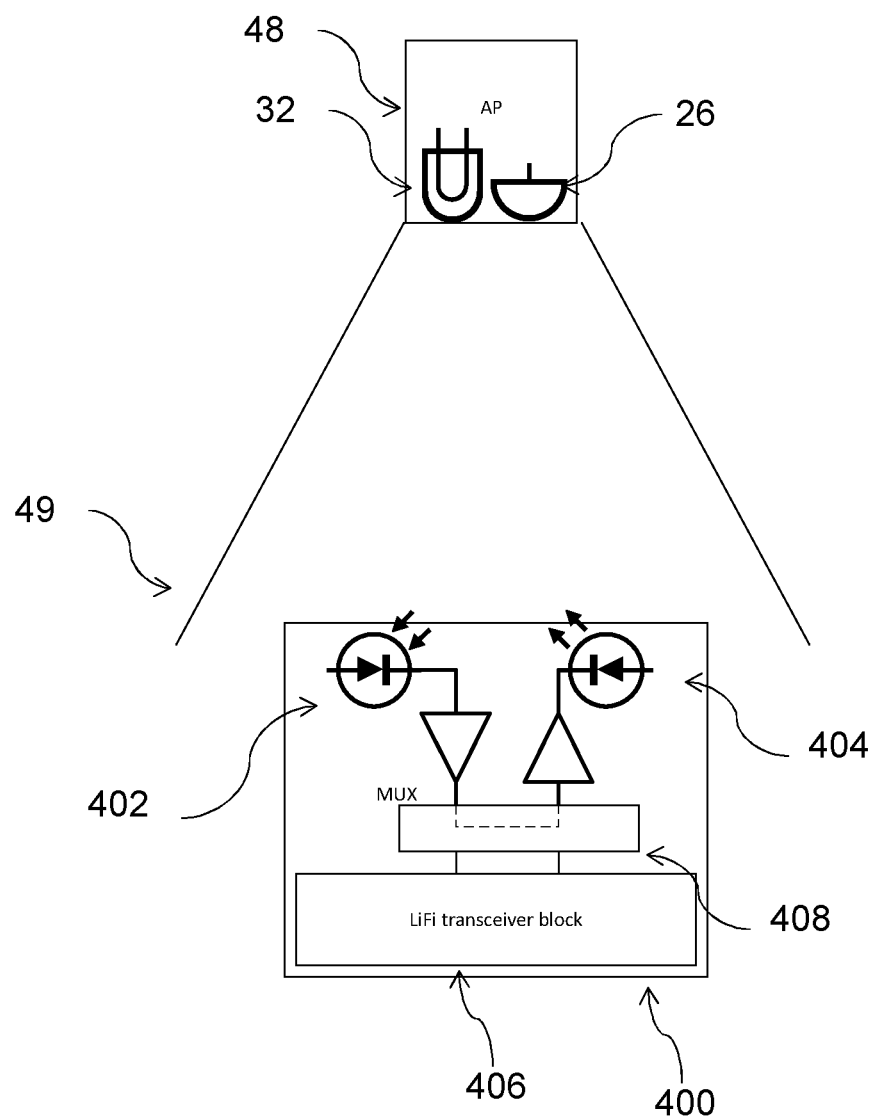
FIG. 13 is a schematic diagram of an access point communicating with a remote device.

In some embodiments, the initial wake-up signal is configured to be sent from the transceiver 20 and relayed by a remote device that is operating in a lower power or what may be referred to as a mirror mode. FIG. 13 shows an example of a remote device operating in a mirror mode, in accordance with embodiments, communicating with the access point. In some embodiments, the wake-up signal is a tone signal.

In FIG. 13, the access point 48 is shown as described with reference to FIG. 3. The remote device 400 has a receiver 402 and a transmitter 404, together with signal processing circuitry 406. In mirror mode, the remote device 400 has a signal mirroring unit 408, which relays the received signal from the receiver 402 to the transmitter 404, by-passing any further signal processing circuitry (for example, the baseband apparatus).

In further embodiments, in addition or alternative to transmitting a wake-up signal, a signal re-transmission process is performed. In these embodiments, in the intermediate power configuration, the transceiver is configured to produce a tone signal. The transceiver is further configured to receive a copy of the tone signal back from the remote device. In such embodiments, the remote device is configured to receive and re-transmit the received tone signal.

In some embodiments, the initial wake-up signal from the transceiver also operates to move the remote device to a higher power configuration.

Figure 14:
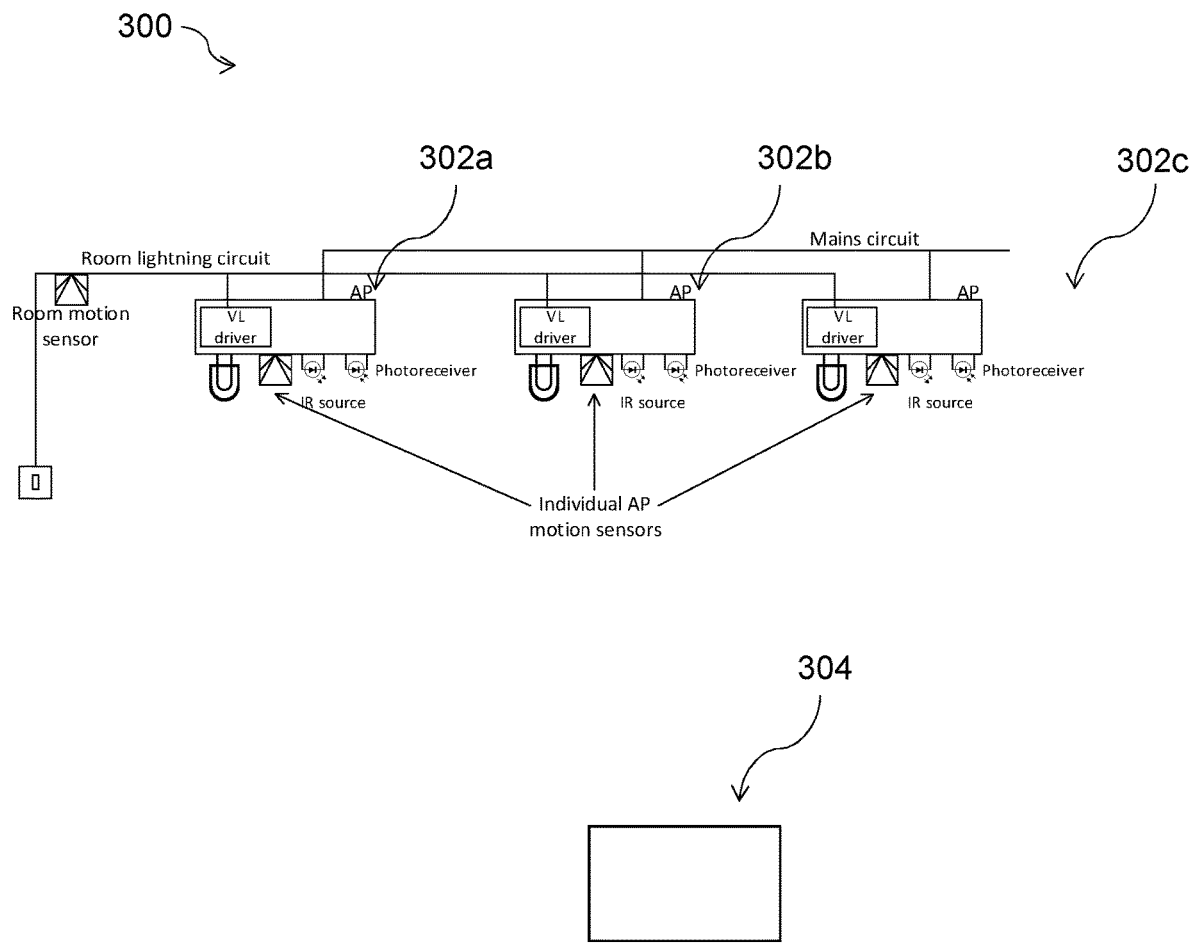
FIG. 14 is a schematic diagram of a system of OWC transceiver apparatuses.

FIG. 14 shows a LiFi network having three access points: a first access point 302a, a second access point 302b, a third access point 302c. Each access point has a transceiver as described with reference to embodiments above and individual access point motion sensors. Each access point has a respective field of view (not shown).

These are referred to as first, second and third field of view respectively. A remote OWC device, station 304 is also provided. Station 304 can communicate with each of the access points using OWC signals.

Station 304 is moveable between the different fields of view of the access points 302a, 302b and 302c. Each motion detector of the access points is configured to detect motion inside its respective field of view.

In use, each of the access points is in a low power mode, which corresponds to their transceivers being in a low power configuration. The station 304 is moved to the first field of view of the transceiver of the first access point 302a. The motion sensor of the first access point senses the motion of the station 304 and performs a switch on in accordance with described embodiments.

The station 304 is then moved to the second field of view of the transceiver of the second access point 302b. The motion sensor of the second access point senses the motion of the station 304 and performs a switch on process in accordance with described embodiments. The station 304 may remain in the first field of view, if the first and second fields of view overlap, or it may be moved out of the first field of view as it is moved into the second field of view.

As the station 304 is moved out of the first field of view, the first transceiver performs a switch off process in accordance with described embodiments. Similar processes are performed as the station 304 is moved to the third field of view.

In further embodiments, the transceiver has timing circuitry or is coupled to timing circuitry. The timing circuitry is configured to limit moving between power states between particular times of the day and/or for particular time periods after certain events.

As a first example, for example, with reference to FIG. 4, in the intermediate mode, the timing circuitry is configured to set a limited time window in which to detect light representative of an optical signal. If the time window lapses without detecting light representative of an optical wireless communication signal, transceiver is returned to the lower power configuration. Timing circuitry can be used in other embodiments, for example, to limit a time window in which to wait for a beacon signal response and/or a wake up signal.

The duration of the timing windows can be selected to be a predetermined length. In some embodiments, the duration of the timing window is selected based on the signal and/or process being performed. For example, the timing window may be selected to have a length that is slightly greater than the length of the beacon signal process (sending and receiving beacon signals).

In the above described embodiments, the controller is described as a separate component. However, it will be understood that the controller may be provided as part of the baseband apparatus circuitry and/or the host processing resource circuitry.

A skilled person will appreciate that variations of the described embodiments are possible without departing from the invention. Accordingly, the above description of specific embodiments is provided by way of example only and not for the purposes of limitation. It will be clear to the skilled person that modifications may be made to the embodiments without departing from the scope of the invention.

The invention claimed is:

1. An optical wireless communication (OWC) transceiver apparatus comprising:
   at least one light transmitter configured to transmit light of a first wavelength or first range of wavelengths;
   driver circuitry configured to receive a data signal and to process the data signal to produce a driving signal to drive the at least one light transmitter such that the at least one light transmitter produces a modulated optical signal representative of said data signal;
   at least one photodetector configured to receive light of a second wavelength or second range of wavelengths and to produce a detection signal in response to the received light;

receiver circuitry configured to receive and process the detection signal to produce a receiver signal; and demodulation circuitry configured to perform a decoding and/or demodulation process in accordance with an OWC protocol thereby to extract data from the receiver signal, wherein the transceiver apparatus further comprises:

a motion sensor configured to sense motion of at least one object in a region about the transceiver apparatus and to produce motion sensor output based on said sensed motion, and a controller configured to move the transceiver apparatus from a lower power configuration to an intermediate power configuration in response to the motion sensor sensing motion, and wherein in the intermediate power configuration, the controller is configured to monitor output from at least the at least one photodetector and/or the receiver circuitry and move the transceiver apparatus from the intermediate power configuration to a higher power configuration in response to the monitored output being indicative that the at least one photodetector has received light representative of an optical wireless communication signal.

2. The transceiver apparatus according to claim 1, wherein at least one of a), b), c), d), e), f) or g):
   a) the at least one light transmitter comprises a light emitting device;
   b) the at least one photodetector comprises a light detector;
   c) the receiver circuitry comprises receiver optical front end circuitry;
   d) the driver circuitry comprises transmitter optical front end circuitry;
   e) the transceiver apparatus further comprises modulation circuitry configured to perform an encoding and/or modulation process in accordance with an OWC protocol thereby to encode data for the modulated optical signal;
   f) the demodulation circuitry and/or modulation circuitry is provided as part of a baseband apparatus; or
   g) the controller comprises controlling circuitry.

3. The transceiver apparatus according to claim 1, wherein the transceiver apparatus is moved from the intermediate power configuration to a higher power configuration in response to the monitored output being indicative that the at least one photodetector has received light representative of at least one of an optical wireless communication protocol signal or activity on an optical channel.

4. The transceiver apparatus according to claim 1, wherein moving the transceiver apparatus between power configurations comprises changing a power state of at least one of the at least one light transmitter, the driver circuitry, the at least one photodetector, the receiver circuitry, or the demodulation circuitry.

5. The transceiver apparatus according to claim 1, wherein when in the intermediate power configuration, the transceiver apparatus is configured to perform a beacon signal process comprising:

transmitting a beacon signal to and receiving a response signal from a remote optical wireless communication enabled device, wherein the controller is configured to move the transceiver apparatus from the intermediate power configuration to the higher power configuration on detecting light representative of an optical wireless communication beacon response signal.

6. The transceiver apparatus according to claim 1, wherein, in an intermediate power mode, the transceiver apparatus is configured to receive at least part of an optical wireless communication signal re-transmitted by a remote device.

7. The transceiver apparatus according to claim 1, wherein at least one of:
   a) in the lower power configuration, the motion sensor is in a power state in which the motion sensor is configured to sense motion and produce motion sensor output and substantially all other components of the transceiver apparatus are in a lower or a switched off state; or
   b) in the higher power configuration, the motion sensor is in a lower or switched off power state and substantially all other components of the transceiver apparatus are in a higher or switched on state.

8. The transceiver apparatus according to claim 1, wherein the at least one light transmitter is configured to transmit light signals through a first field of view and the motion sensor is configured to detect motion that occurs substantially in said first field of view.

9. The transceiver apparatus according to claim 1, wherein in the intermediate power configuration, the at least one light transmitter is configured to transmit a wake-up signal in accordance with a pre-determined protocol to move an operating mode of one or more components of a remote device between two or more power states.

10. The transceiver apparatus according to claim 1, wherein the transceiver apparatus comprises monitoring circuitry configured to monitor for one or more signals from a further device that are transmitted in accordance with a pre-determined timing protocol and the controller is configured to move the transceiver apparatus between two or more power configurations based on at least the motion sensor output and the monitored signals.

11. The transceiver apparatus according to claim 1, wherein the motion sensor comprises at least one shared component with at least one of the at least one light transmitter, the driver circuitry, the at least one photodetector, the receiver circuitry, and/or the demodulation circuitry.

12. The transceiver apparatus according to claim 11, wherein, in the lower power configuration, the at least one shared component is in a higher or intermediate power mode so that the motion sensor is capable of sensing motion.

13. The transceiver apparatus according to claim 1, wherein the motion sensor comprises the at least one photodetector, and the motion sensor output is based on a change in at least one property of the detection signal.

14. The transceiver apparatus according to claim 1, wherein the receiver circuitry comprises a further signal processing element configured to:

determine that the detection signal has one or more characteristics of optical wireless communication signals and provide said signal to the controller, wherein the controller moves the transceiver apparatus from an intermediate power configuration to a higher power configuration in response to receiving said signal.

15. The transceiver apparatus according to claim 1, wherein the motion sensor is configured to monitor light reflections from the at least one object in the region about the transceiver apparatus, or wherein the motion sensor is configured to process detection signals thereby to detect reflection from light transmitted by the transceiver apparatus.

16. The transceiver apparatus according to claim 15, wherein motion is sensed by determining at least one of a change in time of flight, a change in detected light direction, or a change in detected light intensity.

17. The transceiver apparatus according to claim 1, wherein the transceiver apparatus is configured to communicate with a remote device over a visible light channel and a non-visible channel and the controller is configured to control reception and transmission of signals over said channels.

18. The transceiver apparatus according to claim 1, wherein the transceiver apparatus comprises at least one light transmitter that comprises a visible light source and the controller is configured to move the visible light source between at least:
a first power state in which the visible light source emits unmodulated light, and
a second power state in which the visible light source emits modulated light.

19. The transceiver apparatus according to claim 1, further comprising or coupled to a visible light source,
wherein the transceiver apparatus is configured to switch a channel used for optical communication when the light source is switched between on and off.

20. The transceiver apparatus according to claim 1,
wherein the at least one light transmitter comprises a visible light source, and
wherein the controller is further configured to receive an external electronic control signal from a further apparatus and to move the visible light source between two or more power states based on the received external control signal.

21. The transceiver apparatus according to claim 1,
wherein the controller is further configured to perform an identification process to identify a further remote device, and to determine that the further device is a mobile device or a static device based at least on said identification process.

22. The transceiver apparatus according to claim 1,
wherein the controller is further configured to move the motion sensor between two or more power states when moving the transceiver apparatus between power configurations.

23. A method comprising:
sensing motion in a region about a transceiver apparatus;
moving the transceiver apparatus from a lower power configuration to an intermediate power configuration in response to a motion sensor sensing motion;
monitoring output from at least an at least one photodetector and/or receiver circuitry of the transceiver apparatus; and
moving the transceiver apparatus from the intermediate power configuration to a higher power configuration in response to the monitored output being indicative that the at least one photodetector has received light representative of an optical wireless communication signal.

* * * * *

UNITED STATES PATENT AND TRADEMARK OFFICE
CERTIFICATE OF CORRECTION

| | |
|---|---|
| PATENT NO. | : 11,476,941 B2 |
| APPLICATION NO. | : 17/312606 |
| DATED | : October 18, 2022 |
| INVENTOR(S) | : Csajaghy et al. |

It is certified that error appears in the above-identified patent and that said Letters Patent is hereby corrected as shown below:

On the Title Page

(30) Foreign Application Priority Data: Please correct "1820402" to read --1820402.4--

Signed and Sealed this
Seventh Day of February, 2023

Katherine Kelly Vidal
Director of the United States Patent and Trademark Office